US012658037B2

(12) United States Patent
Qiao et al.

(10) Patent No.: US 12,658,037 B2
(45) Date of Patent: Jun. 16, 2026

(54) SYSTEMS FOR DETECTING ROLLING STOPS

(71) Applicant: Geotab Inc., Oakville (CA)

(72) Inventors: Donghao Qiao, Milton (CA);
Shashank Saurav, Toronto (CA);
Javed Siddique, York (CA);
Mohammed Sohail Siddique, Milton (CA)

(73) Assignee: Geotab Inc., Oakville (CA)

( * ) Notice: Subject to any disclaimer, the term of this patent is extended or adjusted under 35 U.S.C. 154(b) by 73 days.

(21) Appl. No.: 18/761,876

(22) Filed: Jul. 2, 2024

(65) Prior Publication Data

US 2025/0140110 A1     May 1, 2025

Related U.S. Application Data

(60) Provisional application No. 63/593,573, filed on Oct. 27, 2023.

(51) Int. Cl.
| | |
|---|---|
| *G08G 1/052* | (2006.01) |
| *B60W 40/09* | (2012.01) |
| *G06V 20/40* | (2022.01) |
| *G06V 20/58* | (2022.01) |
| *G07C 5/00* | (2006.01) |

(52) U.S. Cl.
CPC ............. *G08G 1/052* (2013.01); *B60W 40/09* (2013.01); *G06V 20/44* (2022.01); *G06V 20/582* (2022.01); *G07C 5/008* (2013.01)

(58) Field of Classification Search
None
See application file for complete search history.

(56) References Cited

U.S. PATENT DOCUMENTS

| | | | |
|---|---|---|---|
| 7,505,841 B2 | 3/2009 | Sun et al. | |
| 7,676,087 B2 | 3/2010 | Dhua et al. | |
| 9,405,970 B2 | 8/2016 | Israel et al. | |
| 9,489,635 B1 | 11/2016 | Zhu | |
| 10,496,891 B2 | 12/2019 | Sai | |
| 10,728,420 B2 | 7/2020 | Popa | |
| 10,789,840 B2 * | 9/2020 | Boykin | H04N 23/635 |
| 10,997,434 B2 | 5/2021 | Kurian et al. | |
| 11,336,867 B2 | 5/2022 | Meier et al. | |
| 11,758,096 B2 | 9/2023 | Shah et al. | |
| 11,866,055 B1 | 1/2024 | Srinivasan et al. | |
| 11,900,657 B2 * | 2/2024 | Bravi | G06F 18/24 |
| 11,995,546 B1 | 5/2024 | Srinivasan et al. | |
| 12,300,001 B2 * | 5/2025 | Tal | G08G 1/0137 |
| 2016/0343145 A1 | 11/2016 | Israel et al. | |
| 2019/0152489 A1 | 5/2019 | Innes et al. | |

(Continued)

OTHER PUBLICATIONS

Extended European Search Report for European Application No. 24208776.5, mailed Mar. 14, 2025, 8 pages.

*Primary Examiner* — Todd Melton
(74) *Attorney, Agent, or Firm* — Mark Pringle-Rigby

(57)          ABSTRACT

Systems and methods for detecting rolling stops are discussed. A stop sign is first identified in image data at vehicle devices. The image data of the strop sign and movement data for a speed of the vehicle are sent to a management device. The management device can verify presence of the stop sign, and determine whether the vehicle made a complete stop at the stop sign based on the movement data, a threshold speed, and a stop time threshold.

20 Claims, 10 Drawing Sheets

(56)     References Cited

U.S. PATENT DOCUMENTS

| | | |
|---|---|---|
| 2021/0365700 A1 | 11/2021 | Bravi et al. |
| 2022/0245955 A1 | 8/2022 | Freeman et al. |
| 2022/0327406 A1 | 10/2022 | Balakrishnan et al. |
| 2023/0038842 A1 | 2/2023 | Yu et al. |
| 2023/0061784 A1 | 3/2023 | Agrawal et al. |
| 2023/0260334 A1* | 8/2023 | Di Francesco ...... G07C 5/0866 701/1 |
| 2024/0005675 A1 | 1/2024 | Lelowicz et al. |

* cited by examiner

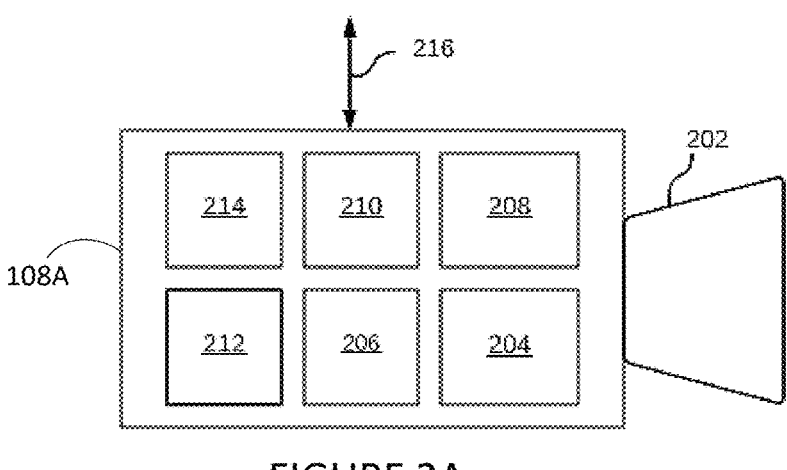
FIGURE 2A
FIGURE 2B
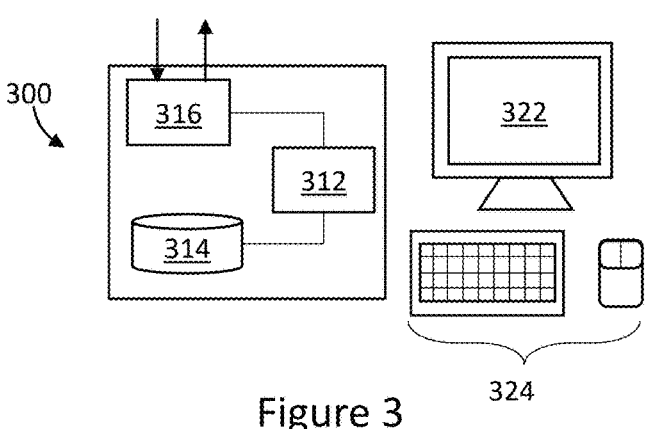
Figure 3

Alert: Rolling Stop
Please come to a complete stop at
all stop signs.

Driver: John Smith

| Event | Occurrences in the last 30 days | Event Data |
|---|---|---|
| Rolling stop | 5 | Click Here |
| Speeding | 2 | Click Here |
| Harsh Braking | 4 | Click Here |
| Harsh Cornering | 1 | Click Here |

SYSTEMS FOR DETECTING ROLLING STOPS

PRIOR APPLICATION DATA

This application claims priority to U.S. Provisional Patent Application No. 63/593,573, titled "Systems and Methods for Detecting Rolling Stops", filed on Oct. 27, 2023, the entirety of which is incorporated by reference herein.

TECHNICAL FIELD

The present disclosure generally relates to systems and methods for determining improper vehicle stopping, and in particular relate to determining when vehicles perform a "rolling stop".

BACKGROUND

Monitoring vehicle movement and positioning is advantageous for fleet managers for a variety of reasons, including improving the safety of their fleet. Via real time monitoring, inappropriate behavior or dangerous situations can be identified, and a driver can be immediately alerted of the dangerous situation. Reports can be prepared indicating or summarizing dangerous situations. Post-incident summarization of driver behaviors can be used in driver coaching and education. Such alerts or reports may reduce occurrence of traffic accidents. Further, monitoring vehicle movement and positioning is also useful in self-driving (autonomous) vehicles.

SUMMARY

According to a broad aspect, the present disclosure describes a system comprising: at least one data collection device positioned at a vehicle; a first communication interface positioned at the vehicle; a first at least one processor positioned at the vehicle; a first at least one non-transitory processor-readable storage medium positioned at the vehicle and communicatively coupled to the first at least one processor, the first at least one non-transitory processor-readable storage medium storing first processor-executable instructions which when executed by the first at least one processor cause the system to: collect, by the at least one data collection device, image data representing an environment of the vehicle; collect, by the at least one data collection device, movement data representing movement of the vehicle; identify, by the first at least one processor according to a first detection model, an event window where a stop sign is represented in the image data; in response to identification of the event window, send, by the first communication interface, an image data segment which includes a portion of the image data corresponding to the event window and a portion of the image data for a buffer time period following the event window; and send, by the first communication interface, a movement data segment including a portion of the movement data corresponding to the event window and the buffer time period; a second communication interface positioned at a management device remote from the vehicle; a second at least one processor positioned at the management device; and a second at least one non-transitory processor-readable storage medium positioned at the management device and communicatively coupled to the second at least one processor, the second at least one non-transitory processor-readable storage medium storing second processor-executable instructions which when executed by the second at least one processor cause the system to: receive, via the second communication interface, the image data segment; receive, via the second communication interface, the movement data segment; determine, by the second at least one processor, whether a movement speed of the vehicle as represented in the movement data segment is below a threshold speed; and output an indication when movement speed of the vehicle as represented in the movement data segment is not below the threshold speed.

The second processor-executable instructions may further cause the second at least one processor to, prior to determining whether a speed of the vehicle is below a threshold speed: verify, according to a second detection model, that the stop sign is represented in the image data segment.

The first processor-executable instructions which cause the first at least one processor to identify the event window may cause the first at least one processor to: identify the event window where a stop sign is represented in a version of the image data having a first resolution; and the first processor-executable instructions which cause the first communication interface to send the image data segment may cause the first communication interface to send the image data segment having image data of a second resolution greater than the first resolution. The second processor-executable instructions may further cause the second at least one processor to, prior to determining whether a speed of the vehicle is below a threshold speed: verify that the stop sign is represented in the image data segment having image data of the second resolution. The second processor-executable instructions which cause the second at least one processor to verify that the stop sign is represented in the image data segment having image data of the second resolution may cause the second at least one processor to: verify, in accordance with a second detection model different from the first detection model, that the stop sign is represented in the image data segment having image data of the second resolution.

The first processor-executable instructions which cause the first at least one processor to identify the event window may cause the first at least one processor to identify the event window where the stop sign is represented in the image under at least one condition of a group of conditions consisting of: a detection confidence by the first detection model exceeds a confidence threshold; a detection time period by the first detection model exceeds a detection time threshold; and a speed of the vehicle as indicated in the movement data segment exceeds a speed threshold.

The first processor-executable instructions which cause the first at least one processor to identify the event window may cause the first at least one processor to identify the event window where the stop sign is recognized according to the first detection model with a detection confidence which exceeds a confidence threshold, for a detection time period which exceeds a detection time threshold, and where a speed of the vehicle as indicated in the movement data exceeds a speed threshold.

The at least one data collection device may include at least one image capture device which captures the image data. The at least one data collection device may include a location sensor which captures at least a portion of the movement data as location data representing a location of the vehicle. The at least one data collection device may be communicatively couplable to an image capture device, to receive the image data as captured by the image capture device. The at least one data collection device may be communicatively couplable to a communication interface of the vehicle, to receive at least one of the image data or the movement data from the vehicle. The at least one data collection device may be communicatively couplable to a communication interface of the vehicle, to receive at least a portion of the movement data from the vehicle as speed data indicative of a movement speed of the vehicle.

The movement data may comprise location data indicative of a position of the vehicle over time; the first processor-executable instructions may further cause the first at least one processor to determine a movement speed of the vehicle over time based on changes in the location data; and the first processor-executable instructions which cause the first communication interface to send the movement data segment may cause the first communication interface to send the movement data segment including the determined movement speed of the vehicle.

The movement data may comprise location data indicative of a position of the vehicle over time; and the second processor-executable instructions may further cause the second at least one processor to determine a movement speed of the vehicle over time based on changes in the location data.

The second processor-executable instructions which cause the second at least one processor to determine whether the movement speed of the vehicle as represented in the movement data segment is below a threshold speed may cause the second at least one processor to: determine whether the movement speed of the vehicle as represented in the movement data segment is below a threshold speed for an amount of time which exceeds a stop time threshold.

The image data may include data points at a first frequency; the movement data may include data points at a second frequency lower than the first frequency; the first processor-executable instructions may further cause the at least one first processor to interpolate the movement data to include data points at the first frequency; and the first processor executable instructions which cause the first communication interface to send the movement data segment may cause the first communication interface to send the movement data segment including interpolated data points at the first frequency.

The second processor-executable instructions may further cause the management device to: send, via the second communication interface, the indication to the first communication interface; and in response to the first communication interface receiving the indication, output, by an output interface at the vehicle, an alert to a driver of the vehicle that a rolling stop was performed.

The second processor-executable instructions may further cause the management device to output the indication in a driver behavior report associated with a driver of the vehicle. The second processor-executable instructions may further cause the second at least one non-transitory processor-readable storage medium to store the image data segment and the movement data segment associated with the indication.

According to another broad aspect, the present disclosure describes a method comprising: receiving, via a communication interface positioned at a management device remote from a vehicle, an image data segment of image data representing an environment of the vehicle, the image data segment including: a portion of the image data corresponding to an event window where a stop sign is represented in the image data, according to a first detection model; and a portion of the image data for a buffer time period following the event window; receiving, via the communication interface, a movement data segment of movement data representing movement of the vehicle, the movement data segment including a portion of the movement data corresponding to the event window and a portion of the movement data corresponding to the buffer time period; determining, by at least one processor positioned at the management device, whether a movement speed of the vehicle as represented in the movement data segment is below a threshold speed; and outputting an indication when movement speed of the vehicle as represented in the movement data segment is not below the threshold speed.

The method may further comprise, prior to determining whether a speed of the vehicle is below a threshold speed: verifying, by the at least one processor according to a second detection model, that the stop sign is represented in the image data segment. Verifying that the stop sign is represented in the image data segment may comprise the at least one processor verifying that the stop is represented in the image data segment according to the second detection model, under at least one condition of a group of conditions consisting of: a detection confidence by the first detection model exceeds a confidence threshold; a detection time period by the first detection model exceeds a detection time threshold; and a speed of the vehicle as indicated in the movement data segment exceeds a speed threshold. Verifying that the stop sign is represented in the image data segment may comprise the at least one processor verifying that the stop is represented in the image data segment according to the second detection model with a detection confidence which exceeds a confidence threshold, for a detection time period which exceeds a detection time threshold, and a speed of the vehicle as indicated in the movement data exceeds a speed threshold.

The event window where a stop sign is represented may be identified based on a version of the image data having a first resolution; and the image data segment received via the communication interface may include image data of a second resolution greater than the first resolution. The method may further comprise, prior to determining whether a speed of the vehicle is below a threshold speed: verifying, by the at least one processor, that the stop sign is represented in the image data segment based on the image data of the second resolution. Verifying that the stop sign is represented in the image data segment based on the image data of the second resolution may comprise: verifying, in accordance with a second detection model different from the first detection model, that the stop sign is represented in the image data segment based on the image data of the second resolution.

The movement data in the movement data segment may comprise speed data indicative of a movement speed of the vehicle. The movement data in the movement data segment may comprise location data indicative of a position of the vehicle over time; and the method may further comprise determining, by the at least one processor, a movement speed of the vehicle over time based on changes in the location data.

Determining whether the movement speed of the vehicle as represented in the movement data segment is below a threshold speed may comprise: determining whether the movement speed of the vehicle as represented in the movement data segment is below a threshold speed for an amount of time which exceeds a stop time threshold.

The image data segment may includes data points at a first frequency; the movement data segment may include data points at a second frequency lower than the first frequency; and the method may further comprise interpolating, by the at least one processor, the movement data to include data points at the first frequency.

The method may further comprise sending, via the communication interface, the indication to be received at the vehicle.

The method may further comprise outputting the indication in a driver behavior report associated with a driver of the vehicle. The method may further comprise storing, by at least one non-transitory processor-readable storage medium at the management device, the image data segment and the movement data segment associated with the indication.

BRIEF DESCRIPTION OF THE DRAWINGS

Exemplary non-limiting embodiments are described with reference to the accompanying drawings in which:

FIG. 2A is a simplified block diagram of an image capture device according to at least one exemplary implementation.

FIG. 2B is a simplified block diagram of an image capture device according to at least one other exemplary implementation.

FIG. 3 is a schematic view of an operator device in accordance with at least one exemplary implementation.

FIG. 7 illustrates an exemplary interface for presenting an alert to a driver.

FIG. 8 illustrates an exemplary interface for presenting a driver behavior report.

DETAILED DESCRIPTION

Figure 1A:
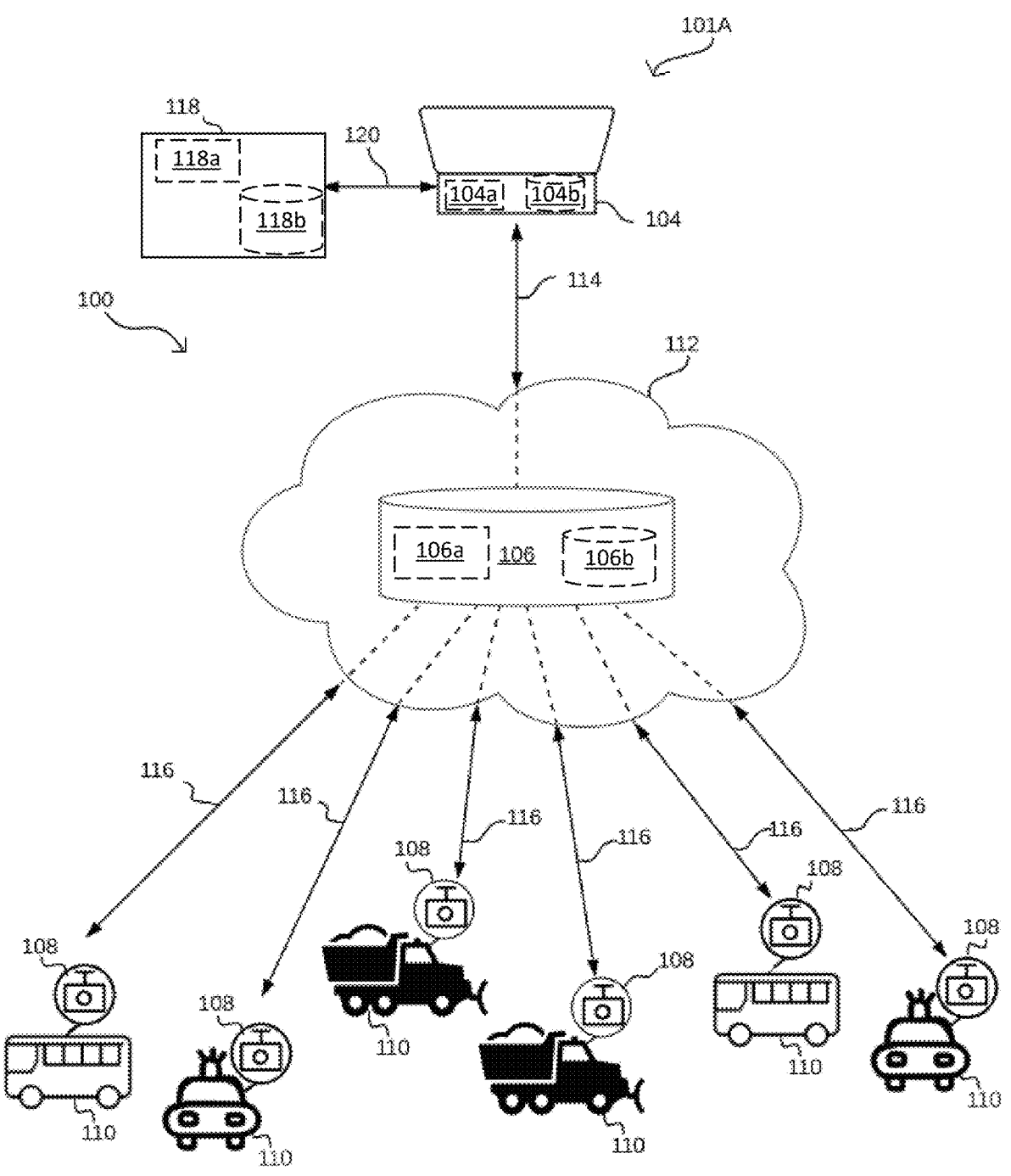
FIG. 1A illustrates a block diagram of an exemplary data collection system.

The present disclosure details systems and methods for identifying vehicle movement through intersections, and in particular identifying when a vehicle fails to properly stop at an intersection. Stop signs are commonly placed at entrances to intersections and require that vehicles come to a complete stop before proceeding through the intersection. Stop signs are also commonly paired with stop lines, which are corresponding lines which indicate specific positions before which a vehicle should stop. Further, intersections governed by stop signs also commonly have crosswalks: spaces specifically designated for pedestrians to cross the intersections. Stop signs and stop lines generally require vehicles to stop before crosswalks, so as to provide pedestrians a comfortable amount of room to traverse the intersections.

By coming to a complete stop at the appropriate location (e.g. immediately before the stop sign, stop line, or crosswalk for an intersection), and taking a moment to view the intersection, a driver can determine a safe opportunity to proceed (i.e. a moment when no other vehicles, pedestrians, or other risks are present in a path of the driver), thereby avoiding collisions. Further, when a plurality of vehicles arrive at similar times to an intersection governed by stop signs, the order in which the vehicles come to a complete stop generally determines the order in which vehicles are allowed to proceed through the intersection (also referred to as right-of-way). When a vehicle fails to come to a complete stop, a driver's ability to effectively evaluate the intersection and perform safe decision making can be compromised, and the driver may cause a collision. Further, when a vehicle fails to come to a complete stop, it is difficult to determine correct right-of-way. While proceeding through an intersection in improper order (taking someone else's right-of-way) may not directly cause a collision, it can frustrate others, and negatively impact the reputation of the driver or vehicle which violated right-of-way (for example if the vehicle is a branded fleet vehicle, it may negatively effect reputation of the fleet). Failing to come to a complete stop when required can be referred to as making a "rolling stop". This generally refers to a situation where a driver slows down at a stop sign, but does not fully "stop" (i.e. vehicle speed never drops to 0) before proceeding through the intersection.

Detection models (e.g. artificial intelligence and/or machine learning models) for identifying features and objects (such as stop signs), based on image data captured by one or more image capture devices (e.g. video cameras or smart video cameras) are discussed herein. Generally, a machine learning model is trained based on a set of training data, after which the model becomes able to analyze input data and reliably detect features or make determinations based on the input data. Exemplary detection models can include, for example, various version of the YOLO (you only look once) model, and can be executed on devices positioned at vehicles, or on devices remote from vehicles, as discussed later.

Figure 1B:
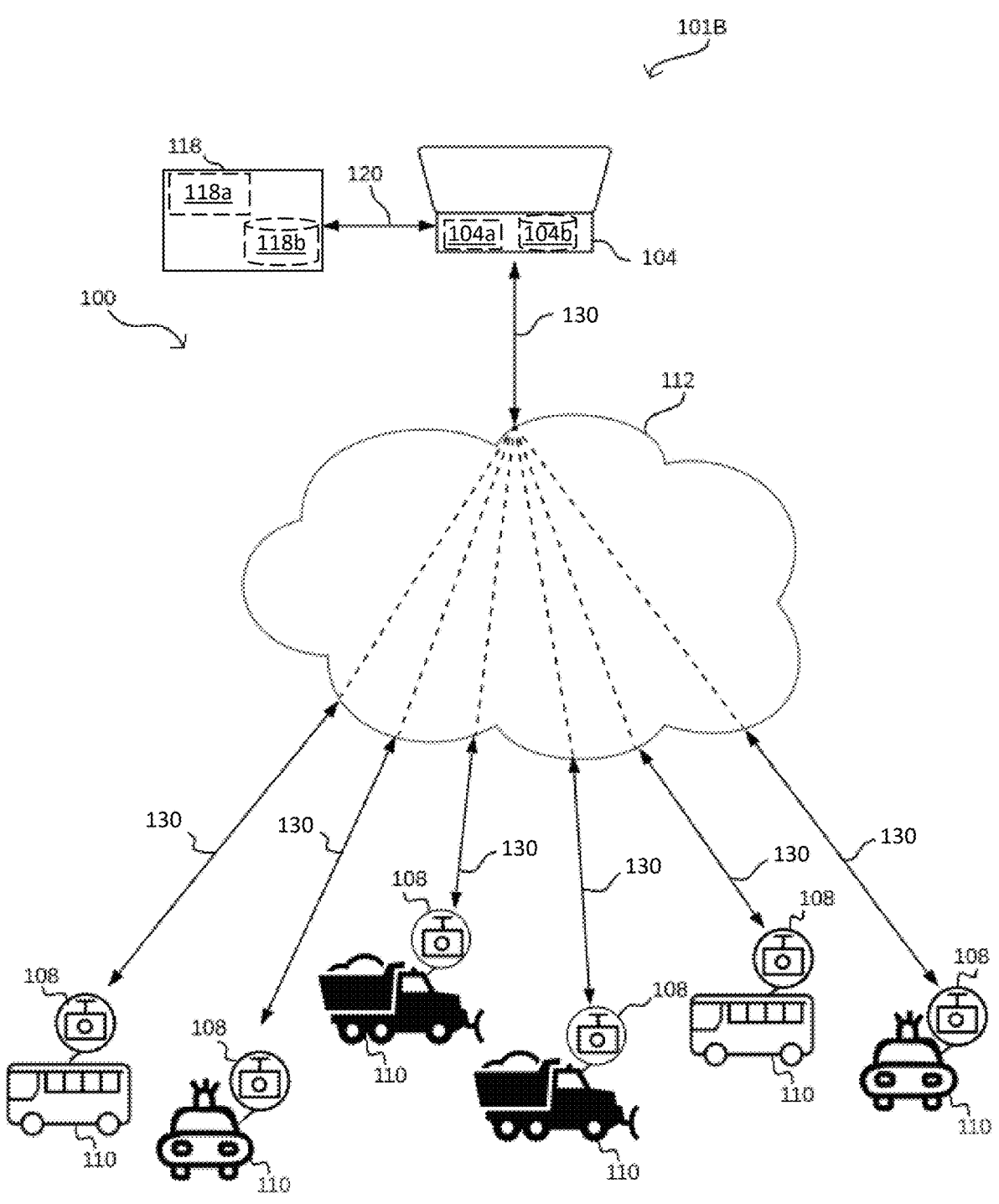
FIG. 1B illustrates a block diagram of another exemplary data collection system.

FIG. 1A and FIG. 1B illustrate block diagrams of exemplary data collection systems 101A and 101B, respectively, and exemplary communication network 100 through which data collection systems 101A and 101B operate. In some implementations, detection models executed at devices local to vehicles can be distributed physically (e.g. by connecting the device to another device to transfer the model, or by using a portable storage medium to transfer the model. Alternatively, communication network 100 can be used to distribute models to vehicle devices (e.g. by sending models to vehicle devices for download).

Communication network 100 may include one or more computing systems and may be any suitable combination of networks or portions thereof to facilitate communication between network components. Some examples of networks include, Wide Area Networks (WANs), Local Area Networks (LANs), Wireless Wide Area Networks (WWANs), data networks, cellular networks, voice networks, among other networks, which may be wired and/or wireless. Communication network 100 may operate according to one or more communication protocols, such as, General Packet Radio Service (GPRS), Universal Mobile Telecommunications Service (UMTS), GSM®, Enhanced Data Rates for GSM Evolution (EDGE), LTE™, CDMA, LPWAN, Wi-Fi®, Bluetooth®, Ethernet, HTTP/S, TCP, and CoAP/DTLS, or other suitable protocol. Communication network 100 may take other forms as well.

Data collection system 101A includes a plurality of data collection devices 108. Data collection devices can comprise (and be referred to herein) telematics devices, image capture devices, smart video cameras (SVCs), but are not strictly limited as such.

A telematics device generally refers to a device which captures data related to vehicle operation, for use in a telematics system. Telematics systems have been employed by fleet owners to monitor use and performance of vehicles in the fleet. A telematics system monitors a vehicle using an onboard telematic device for gathering and transmitting vehicle operation information. For instance, fleet managers can employ telematics to have remote access to real time operation information of each vehicle in a fleet. A vehicle may include a car, truck, recreational vehicle, heavy equipment, tractor, snowmobile or other transportation asset. A telematic device may detect environmental operating conditions associated with a vehicle, for example, outside temperature, attachment status of an attached trailer, and temperature inside an attached refrigeration trailer. A telematic device may also detect operating conditions of an associated vehicle, such as position, (e.g., geographic coordinates), speed, and acceleration, time of day of operation, distance traveled, stop duration, customer location, idling duration, driving duration, among others. Hence, the telematic device collects and transmits data to the telematics system that is representative of the vehicle operation and usage execution. This data may be collected over a time period of sufficient duration to allow for pattern recognition of the vehicle's operation. In an example the duration may be determined to be a number of days between 30 days and 90 days, though in practice any appropriate number of days could be implemented as the duration.

In an exemplary telematics system, raw vehicle data, including vehicle operation information indicative of a vehicle's operating conditions, is transmitted from an onboard telematic device to a remote subsystem, (e.g., data management system which may comprise a cloud system or a management system). Raw vehicle data may include information indicating the identity of the onboard telematic device (e.g., device identifier, device ID) and/or the identity of the associated vehicle the onboard telematic device is aboard. Specific and non-limiting examples of raw vehicle data includes device ID data, position data, speed data, ignition state data, (e.g. indicates whether vehicle ignition is ON or OFF), and datetime data indicative of a date and time vehicle operating conditions were logged by the telematic device. Raw vehicle data transmitted and collected over a period of time forms historical vehicle data which may be stored by the remote subsystem for future analysis of a single vehicle or fleet performance. In practice, a single fleet may comprise many vehicles, and thus large volumes of raw vehicle data (e.g., terabytes, petabytes, exabytes . . . ) may be transmitted to, and stored by, a remote subsystem. Throughout this application, vehicle data collected, processed, and/or transmitted by a telematics device can be broadly included in "telematic data", among other types of data such as location data discussed later.

In general, telematic devices can include sensing modules configured for sensing and/or measuring a physical property that may indicate an operating condition of a vehicle. For example, sensing modules may sense and/or measure a vehicle's position, (e.g., GPS coordinates), speed, direction, rates of acceleration or deceleration, for instance, along the x-axis, y-axis, and/or z-axis, altitude, orientation, movement in the x, y, and/or z direction, ignition state, transmission and engine performance, and times of operation among others. One of ordinary skill in the art will appreciate that these are but a few types of vehicle operating conditions that may be detected.

Telematic devices may comprise a sensing module for determining vehicle position. For instance, the sensing module may utilize Global Positioning System (GPS) technology (e.g., GPS receiver) for determining the geographic position (Lat/Long coordinates) of a vehicle. Alternatively, the sensing module utilizes another a global navigation satellite system (GNSS) technology, such as, GLONASS or BeiDou. Alternatively, the sensing module may further utilize another kind of technology for determining geographic position. In addition, the sensing module may provide other vehicle operating information, such as speed. Alternatively, the telematic device may communicate with a plurality of sensing modules for a vehicle.

Alternatively, vehicle position information may be provided according to another geographic coordinate system, such as, Universal Transverse Mercator, Military Grid Reference System, or United States National Grid.

In general, a vehicle may include various control, monitoring and/or sensor modules for detecting vehicle operating conditions. Some specific and non-limiting examples include, an engine control unit (ECU), a suspension and stability control module, a headlamp control module, a windscreen wiper control module, an anti-lock braking system module, a transmission control module, and a braking module. A vehicle may have any combination of control, monitoring and/or sensor modules. A vehicle may include a data/communication bus accessible for monitoring vehicle operating information, provided by one or more vehicle control, monitoring and/or sensor modules. A vehicle data/communication bus may operate according to an established data bus protocol, such as the Controller Area Network bus (CAN-bus) protocol that is widely used in the automotive industry for implementing a distributed communications network. Specific and non-limiting examples of vehicle operation information provided by vehicle monitoring and/or sensor modules include, ignition state, fuel tank level, intake air temp, and engine RPM among others.

A telematic device may comprise a monitoring module operable to communicate with a data/communication bus of a vehicle. The monitoring module may communicate via a direct connection, such as, electrically coupling, with a data/communication bus of a vehicle via a vehicle communication port, (e.g., diagnostic port/communication bus, OBDII port). Alternatively, the monitoring module may comprise a wireless communication interface for communicating with a wireless interface of the data/communication bus of the vehicle. Optionally, a monitoring module may communicate with other external devices/systems that detect operating conditions of the vehicle.

Data collection devices described herein can collect one or more types of data. For example, a data collection device may include an image capture device or a telematics device as described above, or in some implementations a data collection device can include both an image capture device and a telematics device. Further, in some implementations a data collection device can be monolithically packaged (e.g. as a single component), or can comprise multiple elements communicatively coupled to each other. In some implementations, a data collection device (or elements thereof) can be integrated within a vehicle (e.g. built into the vehicle). In other implementations, a data collection device (or elements thereof) can be designed to be easily installable to (and removable from) a vehicle.

The plurality of data collection devices 108 are positioned at (e.g. mounted in/on, or placed within or on, integrated with, or installed to) a plurality of vehicles 110. Data collection system 101A also includes cloud server 106, client device 104 and local server 118. Client device 104 is communicatively coupled to local server 118 via communication link 120. Client device 104 is also shown as including at least one processor 104a and at least one non-transitory processor-readable storage medium 104b. The at least one processor 104a can perform acts such as determination, identification, data analysis, processing, and other appropriate acts, such as acts in the methods described herein. The at least one non-transitory processor-readable storage medium 104*b* can store any appropriate data, including processor-executable instructions which when executed by the at least one processor 104*a* cause the client device 104 to perform acts, such as acts of the methods described herein. An exemplary client device may include a personal computer, server, a system, a combination of subsystems, and devices. Specific and non-limiting examples of an image capture device or smart video camera (as a data collection device) include a Netradyne® video camera and a Nauto® video camera. Reference to a "camera" in this disclosure can include a smart video camera, but may also include a more basic camera. In this regard, the term "camera" can be used interchangeably with "image capture device". Each data collection device 108 is communicatively coupled to cloud server 106 in cloud 112 via a respective communication link 116. For example, each data collection device 108 and the cloud server 106 are configured to wirelessly communicate to each other. Cloud server 106 is also shown as including at least one processor 106*a* and at least one non-transitory processor-readable storage medium 106*b*. The at least one processor 106*a* can perform acts such as determination, identification, data analysis, processing, and other appropriate acts, such as acts in the methods described herein. The at least one non-transitory processor-readable storage medium 106*b* can store any appropriate data, including processor-executable instructions which when executed by the at least one processor 106*a* cause the cloud server 106 to perform acts, such as acts of the methods described herein. Cloud server 106 is communicatively coupled to client device 104 via communication link 114. For example, each cloud server 106 and client device 104 are configured to wirelessly communicate to each other. As another example, cloud server 106 and client device 104 are configured to communicate with each over a wired connection. In some implementations, local server 118 may be a remote server from client device 104. Local server 118 is also shown as including at least one processor 118*a* and at least one non-transitory processor-readable storage medium 118*b*. The at least one processor 118*a* can perform acts such as determination, identification, data analysis, processing, and other appropriate acts, such as acts in the methods described herein. The at least one non-transitory processor-readable storage medium 118*b* can store any appropriate data, including processor-executable instructions which when executed by the at least one processor 118*a* cause the local server 118 to perform acts, such as acts of the methods described herein.

Data collection system 101B in FIG. 1B includes a plurality of data collection devices 108, positioned at a plurality of vehicles 110, similar to in FIG. 1A. Data collection system 101B also includes client device 104 and local server 118, similar to in FIG. 1A. In the example of FIG. 1B, client device 104 is communicatively coupled to local server 118 via communication link 120. An exemplary client device may include a personal computer, server, a system, a combination of systems subsystems, and devices. Specific and non-limiting examples of an image capture device include a Netradyne® video camera and a Nauto® video camera. Each data collection device 108 is communicatively coupled to client device 104 via a respective communication link 130. For example, each data collection device 108 is configured to wirelessly communicate with client device 104. In some implementations, local server 118 may be a remote server from client device 104. The description of components in data collection system 101A in FIG.

1A is applicable to similarly labelled components in data collection system 101B in FIG. 1B.

Specific and non-limiting examples of vehicle types which each of vehicles 110 can be include: a government owned and operated vehicle, (e.g., as a vehicle for snow clearing, infrastructure maintenance, police enforcement), a public transportation vehicle, (e.g., bus, train), and a privately owned vehicle, (e.g., taxi, courier vehicle), among others.

A data collection device 108 may be mounted to or positioned at a vehicle 110 in a manner such that as an image capture device, data collection device 108 captures image data of the environment outside the vehicle 110, e.g., towards the windshield, towards a window, atop the vehicle, etc. Additionally, and/or optionally, a data collection device 108 may include an image capture device mounted to or positioned at a vehicle 110 in a manner such that the data collection device 108 captures image data of the interior of the vehicle.

Alternatively, and/or optionally, data collection systems 101A, 101B further include one or more data collection devices 108 coupled to a person and/or object wherein the object is not a vehicle. For example, a data collection device 108 can be coupled to a person, e.g., a helmet of a motorcycle driver.

Now referring to FIG. 2A, shown is a simplified block diagram of exemplary data collection device 108A according to one implementation (as an image capture device/smart video camera). Data collection device 108A as shown in FIG. 2A can be implemented as any of the data collection devices 108 shown in FIGS. 1A and 1B. Data collection device 108A includes lens 202, optoelectronics 204, at least one processor 206, location module 208 (e.g., including a GPS receiver), wireless communication module 210 (e.g., including a 4G or 5G communication module for providing cellular connectivity) and at least one non-transitory processor-readable storage medium 212. Optionally, the at least one non-transitory processor-readable storage medium 212 includes another non-transitory processor-readable storage medium 214 (or includes any appropriate number of additional non-transitory processor-readable storage mediums). In the context of this disclosure, the term "datastore" refers to a non-transitory processor-readable storage medium. In some implementations, a single non-transitory processor-readable storage medium corresponds to a single datastore. In other implementations, a non-transitory processor-readable storage medium can be virtually partitioned to include a plurality of "datastores". Wireless communication module 210 is operable to communicate (shown as communication interface 216) with other devices (e.g. cloud device 106 or client device 104 discussed with reference to FIGS. 1A and 1B) over a communication network (e.g. cloud 112 discussed with reference to FIGS. 1A and 1B).

Now referring to FIG. 2B, shown is a simplified block diagram of exemplary image capture device 108B according to one implementation (which is coupled to a peripheral device 220, such as a telematic device). FIG. 2B includes many components with the same reference number as components discussed with reference to FIG. 2A. The description of such components in FIG. 2A is applicable to the similarly numbered components in FIG. 2B. In FIG. 2B, image capture device 108B includes lens 202 and optoelectronics 204. In this implementation, image capture device 108B is itself directed to capturing image data, which is in turn provided to a peripheral device 220 via a communication interface 222 (e.g. a wired or wireless communication interface). In some implementations, peripheral device 220 is vehicle device, such as a telematics device positioned at a vehicle. In other implementations, peripheral device 220 comprises a collection of components integrated into a vehicle which communicate with each other (e.g. OEM integrated electronics). In FIG. 2B, peripheral device 220 is shown as including the at least one processor 206, the location module 208, the wireless communication module 210, and the at least one non-transitory processor-readable storage medium 212, similar to the components included in data collection device 108A in FIG. 2A. While not illustrated in FIG. 2B to reduce clutter, the at least one non-transitory processor-readable storage medium 212 optionally includes any appropriate number of additional non-transitory processor-readable storage mediums. Wireless communication module 210 is operable to communicate (shown as communication interface 216) with other devices (e.g. cloud device 106 or client device 104 discussed with reference to FIGS. 1A and 1B) over a communication network (e.g. cloud 112 discussed with reference to FIGS. 1A and 1B). Collectively, image capture device 108B and peripheral device 220 can be referred to as a data collection device. Alternatively, peripheral device 220 can be referred to as the data collection device, which collects image data from a separate image capture device 108B.

Collectively, reference to a data collection device 108 or a plurality of data collection devices 108 can include any of the data collection devices discussed herein, include for example a telematics device, data collection device 108A in FIG. 2A, or the data collection device in FIG. 2B.

FIG. 3 is a schematic view of an operator device 300, which could be used for management and use in any of the implementations discussed herein, and in particular is useful as a server-side device. For example, device 300 could be used as client device 104 in FIGS. 1A and 1B, or as a user interface device to provide input to these devices. Device 300 as illustrated includes at least one processor 312, at least one non-transitory processor-readable storage medium 314, and a communication interface 316. The non-transitory processor-readable storage medium 314 can have processor-readable instructions stored thereon which, when executed by the at least one processor 312 cause the device 300 to perform appropriate operations for the methods described herein. Communication interface 316 can be a wired or wireless interface, through which data and inputs can be provided to device 300, and through which data and outputs can be provided by device 300. For example, location data for a plurality of vehicles can be received from a telematics device or system by communication interface 316, for processing and analysis by the at least one processor 312. Resulting analysis can also be output by communication interface 316.

FIG. 3 also illustrates exemplary input and output devices through which a user or operator can interact with device 300. In particular, FIG. 3 shows a display 322, which can display outputs from device 300. Other output devices could be provided such as speakers, or any other appropriate output device. FIG. 3 also shows a keyboard and mouse 324, which can be used to provide inputs to the device 300. Other input devices could also be used, such as a touchscreen, microphone, trackpad, or any other appropriate input device. Although the input and output devices illustrated in FIG. 3 appear in the form of those used with a desktop computer, other forms of devices could also be used, such as portable devices like a laptop, smartphone, PDA, tablet, or any other appropriate device. Further, a device to which a user provides input and receives output can be remote from the device 300. For example, the device including the at least one processor 312, the at least one non-transitory processor-readable storage medium 314, and the communication interface 316 can be a server, which is remote from a workstation or device with which the user interacts.

Figure 4:
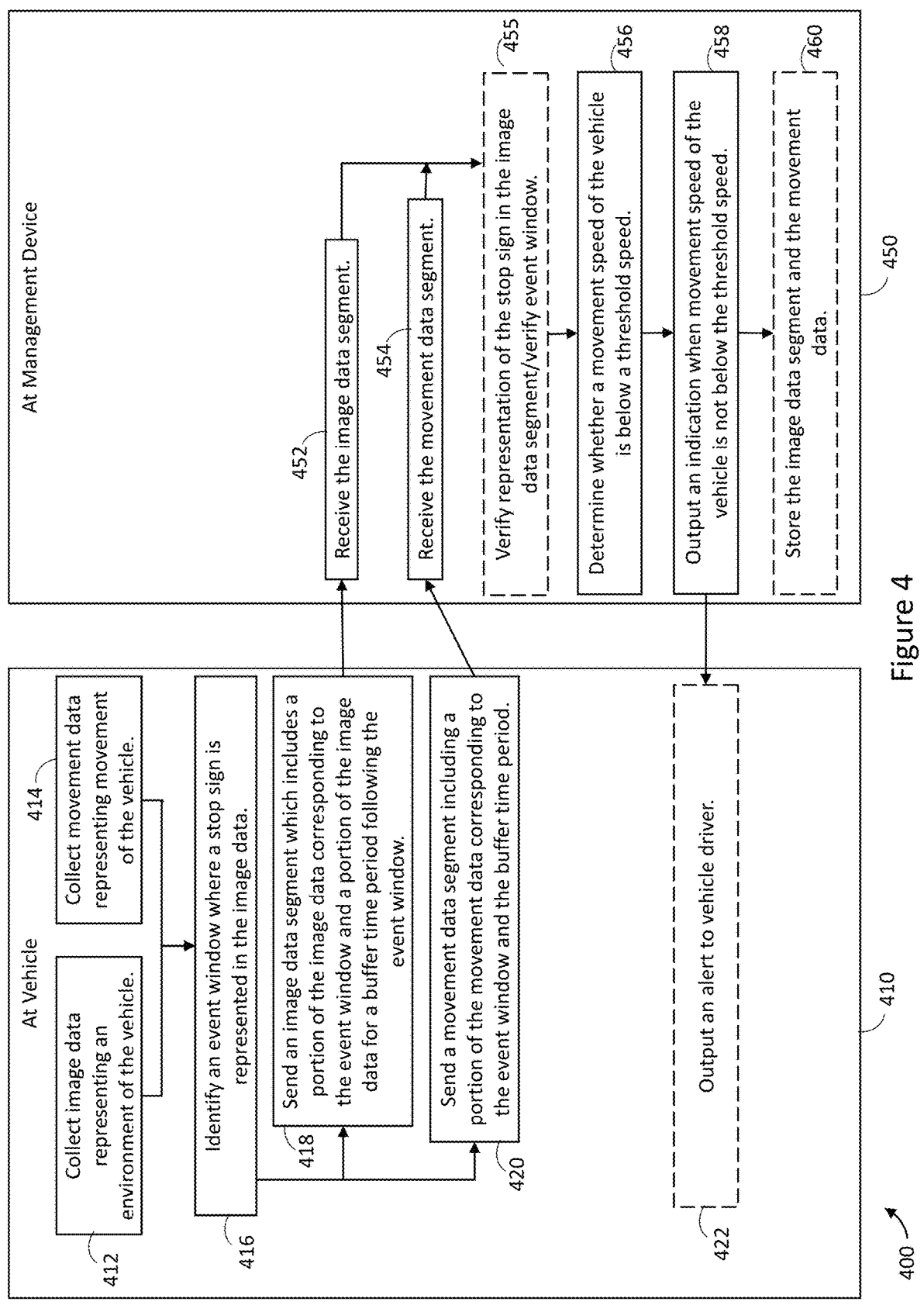
FIG. 4 is a flowchart diagram which illustrates a method for detecting a rolling stop in accordance with at least one exemplary implementation.

FIG. 4 is a flowchart diagram which illustrates an exemplary method 400 for identifying and reporting a rolling stop. Method 400 as illustrated includes acts 412, 414, 416, 418, 420, and optionally 422 performed at a vehicle (grouped as 410). Method 400 as illustrated also includes acts 452, 454, 456, 458, and optionally 460 performed at a management device (grouped as 450). One skilled in the art will appreciate that additional acts could be added, acts could be removed, or acts could be reordered as appropriate for a given application. With reference to the examples illustrated in FIGS. 1A, 1B, 2A, 2B, and 3, acts can be performed by appropriate components of the discussed systems or devices, as discussed below.

Acts grouped as 410 can be performed by any appropriate device or collection of elements at a vehicle, with several examples discussed earlier. In particular, method 400 makes use of at least one data collection device positioned at a vehicle (such as data collection device 108, 108A, 108B, or 220 discussed with reference to FIGS. 1A, 1B, 2A, and 2B), a first communication interface at a vehicle (such as vehicle-side hardware for communication links 116 or 130 in FIGS. 1A and 1B, or communication modules 210 or communication interfaces 216 in FIGS. 2A and 2B), a first at least one processor positioned at the vehicle (such as processors 206 in FIGS. 2A and 2B), a first a least one non-transitory processor-readable storage medium positioned at the vehicle (such as non-transitory processor-readable storage mediums 212 and 214 in FIGS. 2A and 2B), and optionally an output device positioned at the vehicle (such as an infotainment device or speakers, as discussed later with reference to FIG. 7). In some implementations, the acts grouped as 410 in FIG. 4 can be stored as first processor-executable instructions on the first non-transitory processor-readable storage medium. When the first processor-executable instructions are executed by the first at least one processor, they cause the system (in this case the respective hardware) to perform the acts grouped as 410. Respective hardware which can perform the acts is discussed later, with the discussion of each act itself.

Acts grouped as 450 can be performed by any appropriate device or collection of elements at a management device. In this context, a "management device" is not limited to a single device, and generally refers to components which perform management activities for a given vehicle or fleet of vehicles. A management device could for example can comprise any, all of, or some partial combination of could server 106, client device 104, and local server 118 discussed with reference to FIGS. 1A and 1B. The management device in the context of method 400 includes a second communication interface (such as server-side hardware for communication links 114, 116, 120, or 130 in FIGS. 1A and 1B), a second at least one processor (such as any or some combination of processors 106*a*, 104*a*, and 118*a*), a second at least one non-transitory processor-readable storage medium (such as any or some combination of non-transitory processor-readable storage mediums 106*b*, 104*b*, and 118*b*), and optionally an operator interface (such as that shown in FIG. 3). In some implementations, the acts grouped as 450 in FIG. 4 can be stored as second processor-executable instructions on the second non-transitory processor-readable storage medium. When the second processor-executable instructions are executed by the second at least one processor, they cause the system (in this case the respective hardware) to perform the acts grouped as 450. Respective hardware which can perform the acts is discussed later, with the discussion of each act itself.

Method 400 illustrates interaction between a vehicle-side device (vehicle device at the vehicle) and a server-side device (management device). In some implementations, the vehicle side hardware and the management device side may be owned and/or managed by separate entities. In this regard, it is within the scope of the present disclosure that a given entity produce a device or collection of devices which performs only the acts grouped as 410, or only the acts grouped as 450.

Method 400 in FIG. 4 is discussed with reference to an exemplary scenario illustrated in FIGS. 5A, 5B, 5C, and 5D, for ease of understanding. However, method 400 is applicable to a great many scenarios, and the scenario shown in FIGS. 5A, 5B, 5C, and 5D should not be construed as limiting.

FIGS. 5A, 5B, 5C, and 5D are top views of an intersection 510, at four instants in time. Intersection 510 is a four-way intersection which connects four roadways 520, 530, 540, and 550. Intersection 510 is an "all-way stop" intersection, in that there is a respective stop sign for each roadway, indicating that vehicles which approach the intersection 510 must stop before proceeding through. Specifically, stop sign 526 indicates that vehicles approaching intersection 510 by roadway 520 must stop at or before stop line 528. Roadway 520 is shown having boundaries 522 and 524, which are helpful for understanding FIGS. 6A, 6B, and 6C described later. Stop sign 536 indicates that vehicles approaching intersection 510 by roadway 530 must stop at or before stop line 538. Stop sign 546 indicates that vehicles approaching intersection 510 by roadway 540 must stop at or before stop line 548. Stop sign 556 indicates that vehicles approaching intersection 510 by roadway 550 must stop at or before stop line 558.

While FIGS. 5A, 5B, 5C, and 5D show each stop sign as being accompanied by a respective stop line, this is not necessarily the case. In some scenarios, a stop sign alone can indicate where a vehicle is expected to stop when approaching an intersection, or vehicles may be expected to stop before a boundary of the intersection indicated by a curb of the roadway. Further, FIGS. 5A, 5B, 5C, and 5D do not show intersection 510 as including any crosswalks to reduce clutter. However, the description of FIGS. 5A, 5B, 5C, and 5D otherwise fully applies to intersections including at least one crosswalk.

Figure 5B:
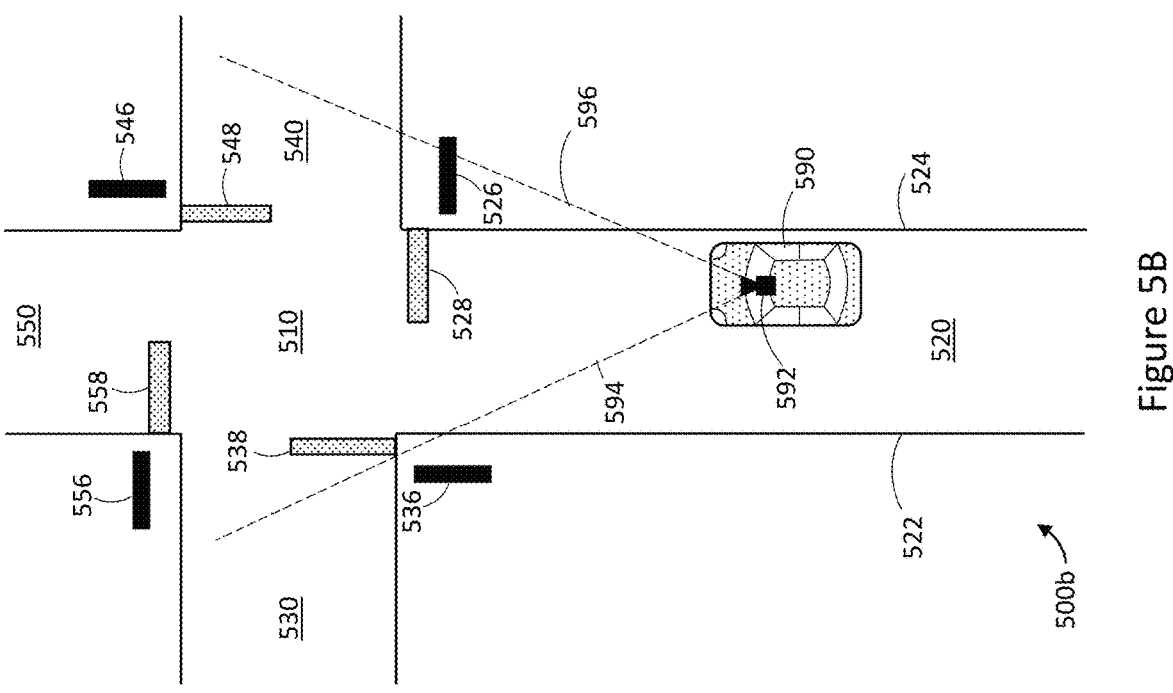
FIGS. 5A, 5B, 5C, and 5D are top views of respective instants in time in an exemplary scenario.
Figure 5A:
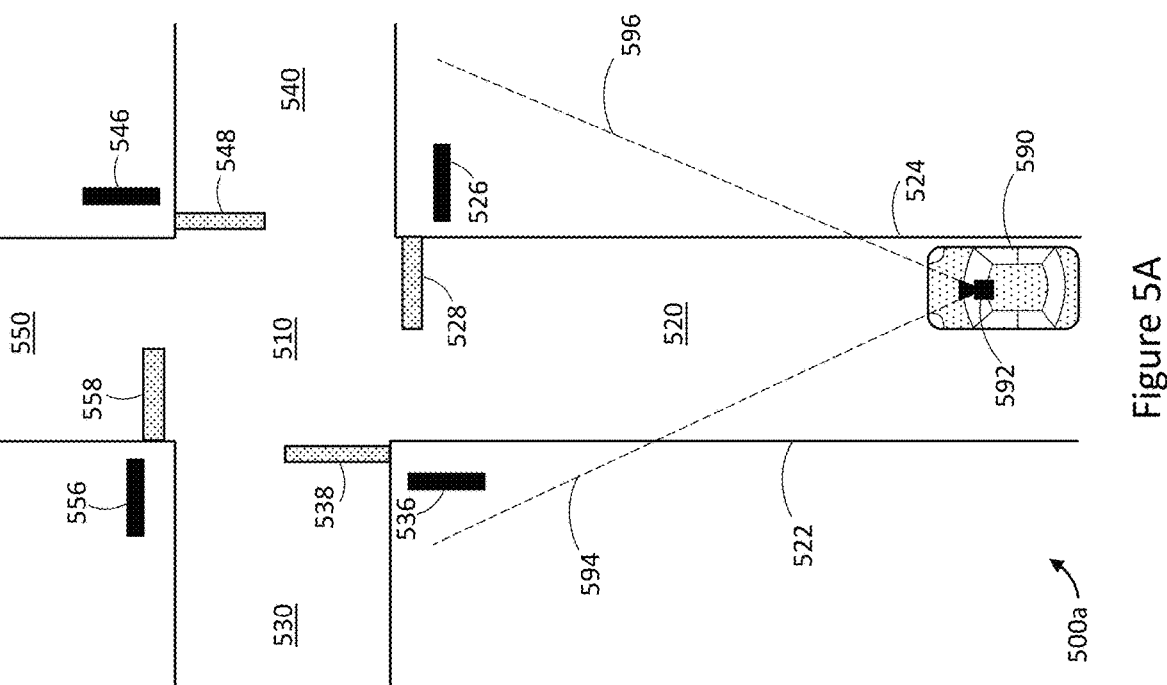
Figure 5D:
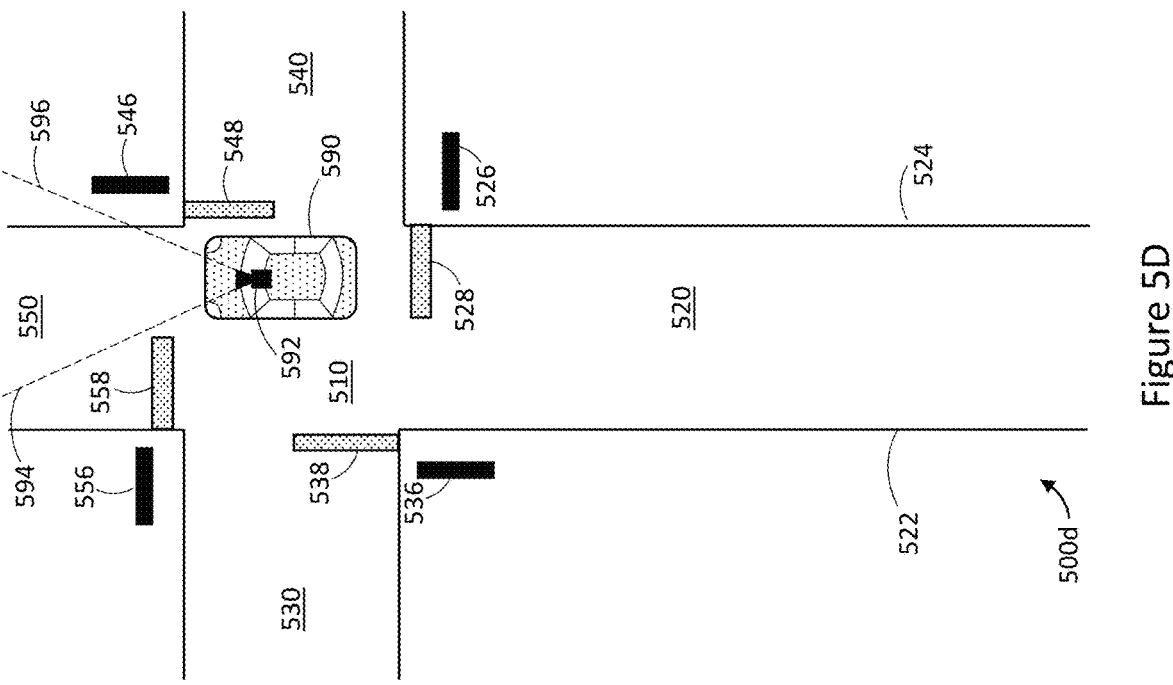
Figure 5C:
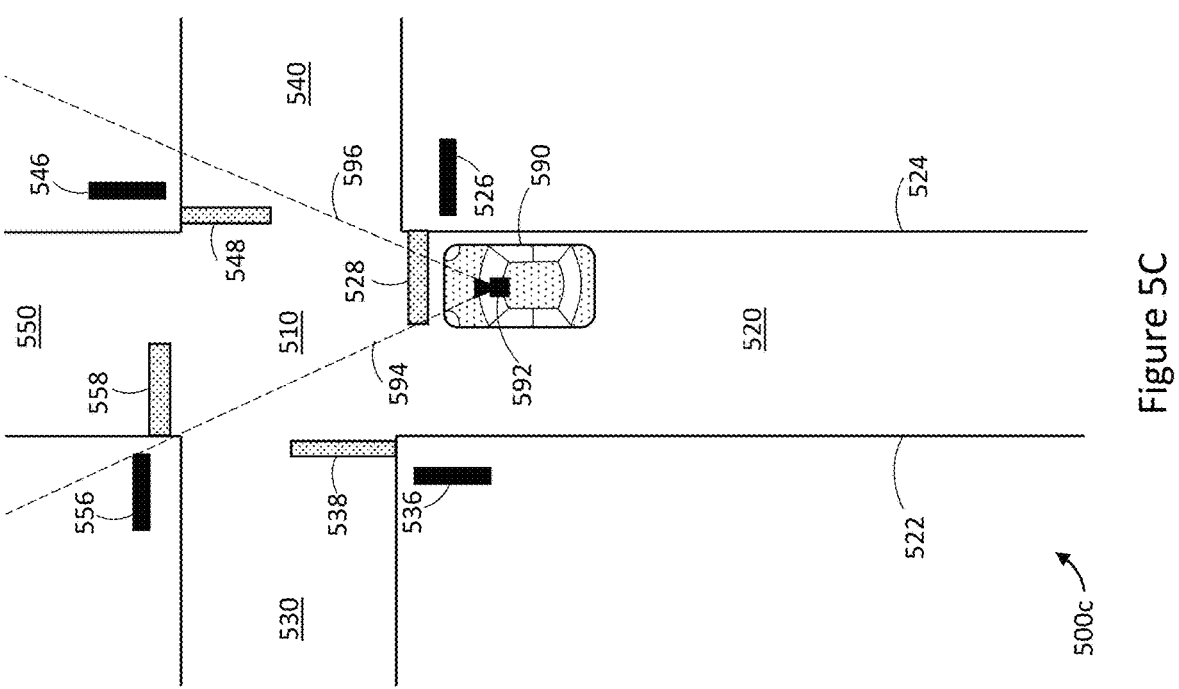
Figure 6A:
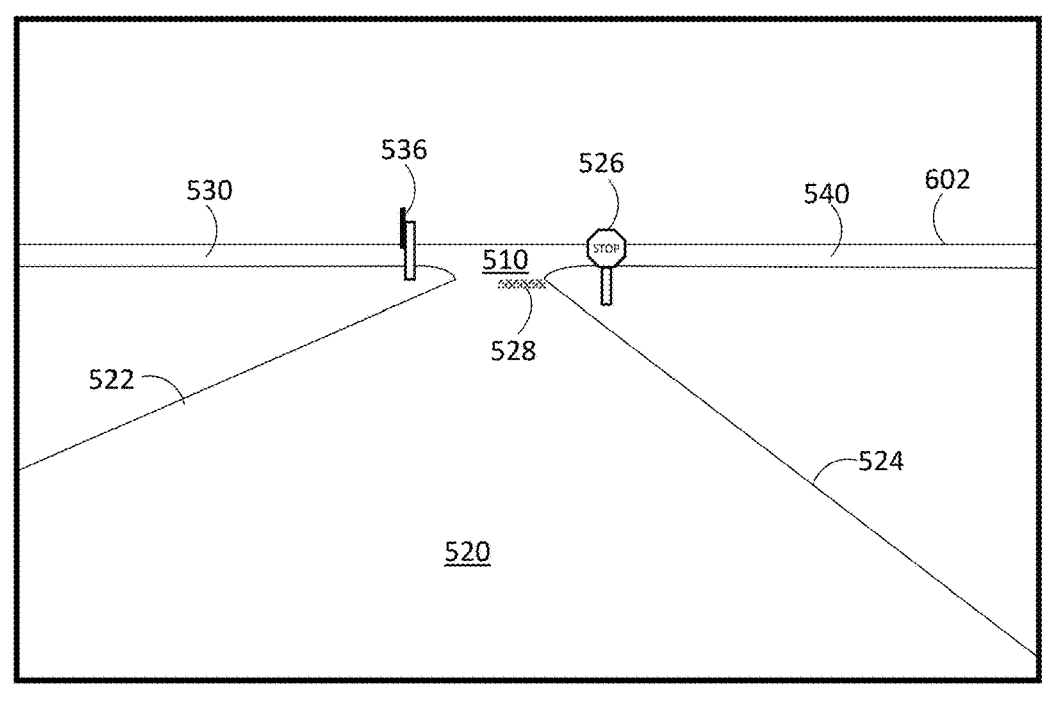
FIGS. 6A, 6B, 6C, and 6D are images from a perspective of an image capture device in a vehicle, at the respective instants in time illustrated in FIGS. 5A, 5B, 5C, and 5D.
Figure 6B:
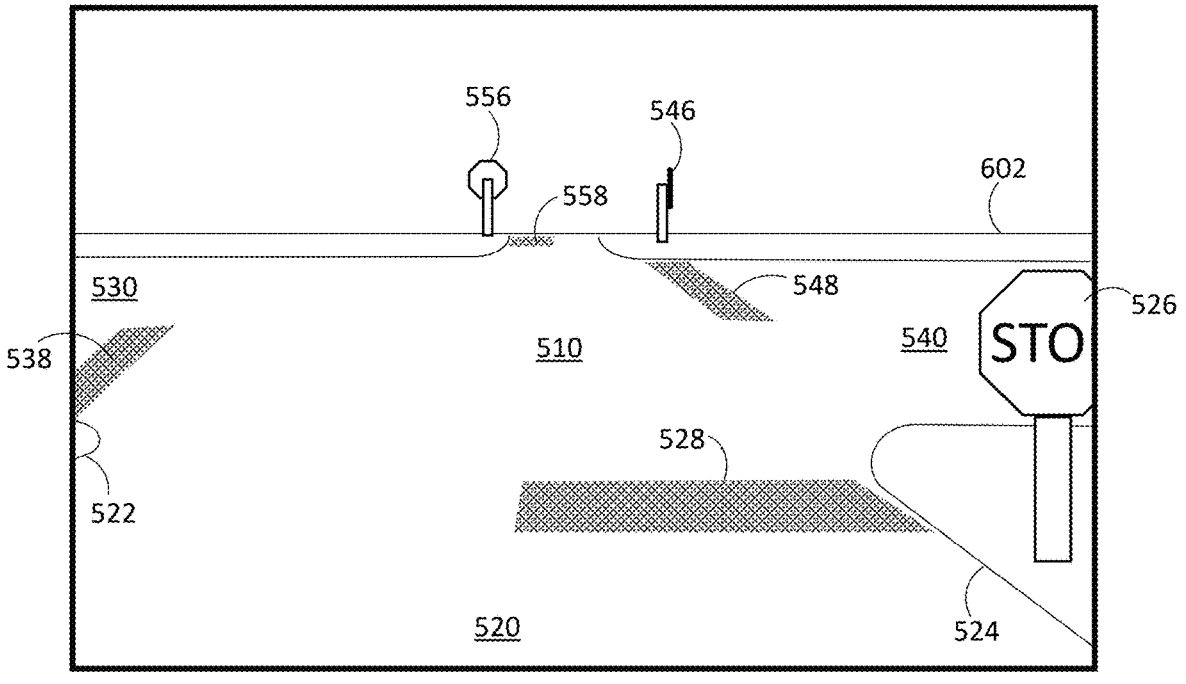
Figure 6C:
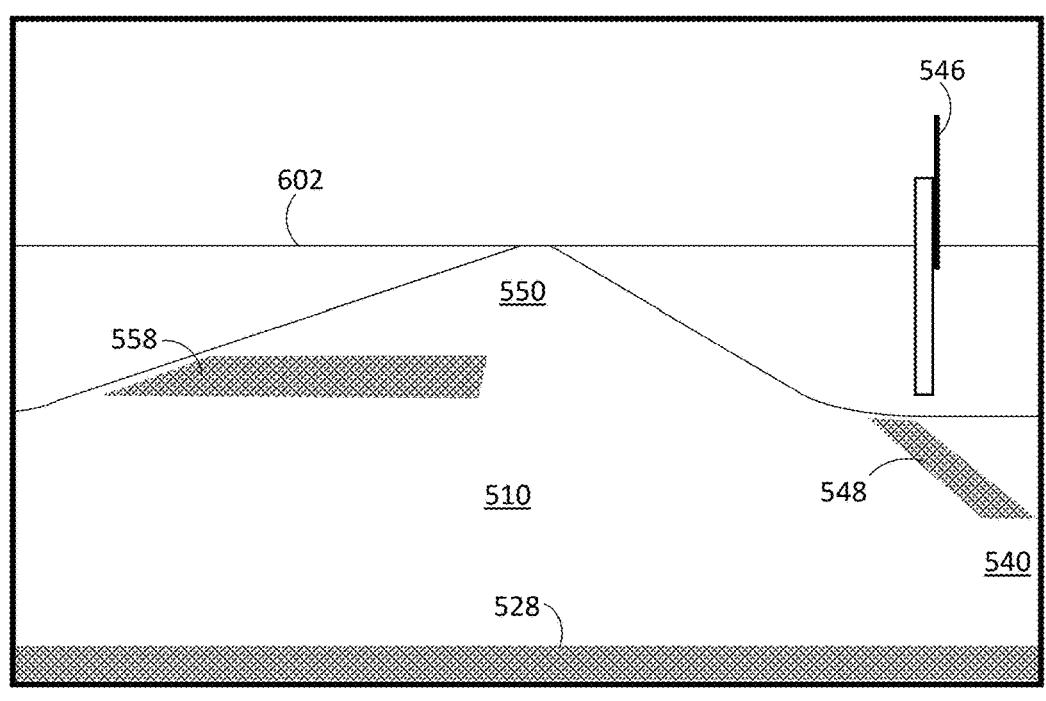
Figure 6D:
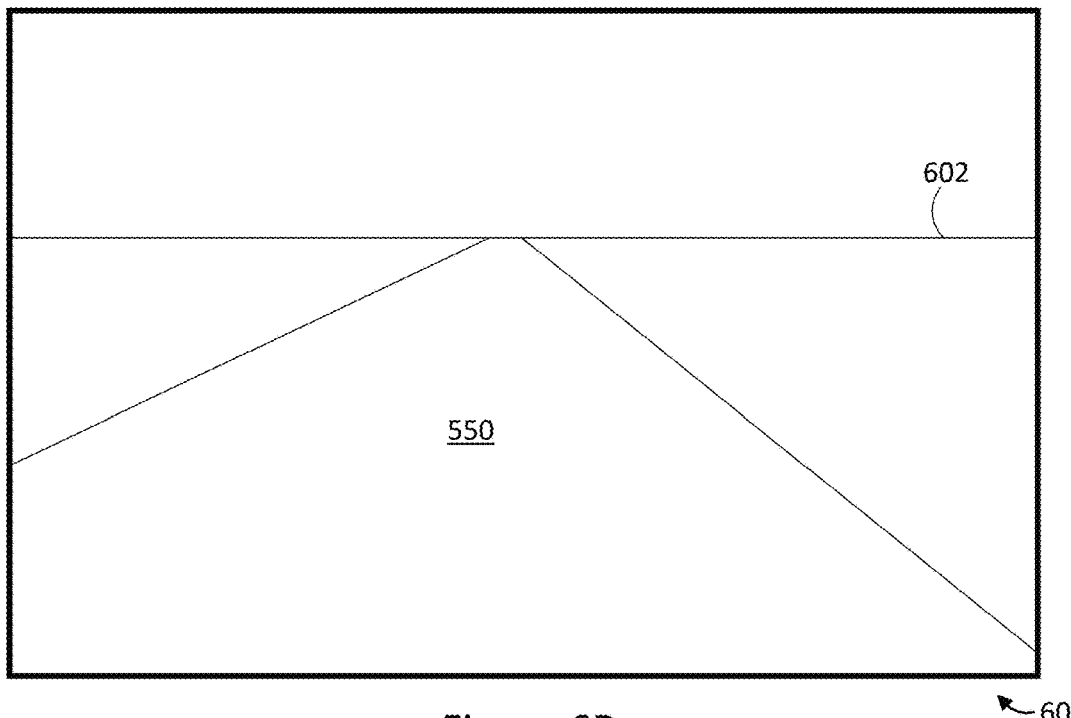

FIG. 5A illustrates an instant 500a, FIG. 5B illustrates an instant 500b, FIG. 5C illustrates an instant 500c, and FIG. 5D illustrates an instant 500d. Instants 500a, 500b, 500c, and 500d occur in sequence, though other instants can exist between the illustrated instants. Collectively, the scenario illustrated by instants 500a, 500b, 500c, and 500d can be referred to as scenario 500. In scenario 500, a vehicle 590 approaches, and passes through, intersection 510. In particular, at instant 500a, vehicle 590 approaches, but is still far away from intersection 510. At instant 500b, vehicle 590 is close to intersection 510, but not yet at a point where vehicle 590 should be stopped. At instant 500c, vehicle 590 is proximate intersection 590, and should be stopped (assuming the driver practices proper stopping behavior and stops before stop line 528). At instant 500d, vehicle 590 is travelling through intersection 510, and should no longer be stopped.

An image capture device 592 is positioned at (e.g. installed at or carried by) vehicle 590, and captures image data through at least instants 500a, 500b, 500c, and 500d

(and can also capture image data through other instants prior to instant 500a, after instant 500d, and intervening instants between the described instants). A field of view of image capture device 592 is shown by field of view lines 594 and 596.

FIGS. 6A, 6B, 6C, and 6D illustrate images from the perspective of image capture device 592, captured at the respective instants shown in FIGS. 5A, 5B, 5C, and 5D. In particular, image 600a in FIG. 6A corresponds to image data captured by image capture device 592 at instant 500a. Image 600b in FIG. 6B corresponds to image data captured by image capture device 592 at instant 500b. Image 600c in FIG. 6C corresponds to image data captured by image capture device 592 at instant 500c. Image 600d in FIG. 6D corresponds to image data captured by image capture device 592 at instant 500d. The features labelled in images 600a, 600b, 600c, and 600d correspond to those labelled in FIGS. 5A, 5B, 5C, and 5D, and description of the scenario 500 in FIGS. 5A, 5B, 5C, and 5D is fully applicable to the images 600a, 600b, 600c, and 600d in FIGS. 6A, 6B, 6C, and 6D. In FIGS. 6A, 6B, 6C, and 6D, a horizon 602 is visible in the image data.

Returning to FIG. 4, as mentioned earlier method 400 includes a plurality of acts 410 performable at the vehicle, and a plurality of acts 450 performable at a management device.

At 412, a data collection device positioned at the vehicle collects image data representing an environment of the vehicle. In some implementations, the data collection device includes an image capture device, and act 412 entails the image capture device capturing the image data. In other implementations, the data collection device is communicatively couplable to an image capture device, such that act 412 entails the data collection device receiving the image data as captured by the image capture device. For example, the data collection device can be a peripheral device or telematics device which communicatively couples to the image capture device. In some implementations, the data collection device is communicatively couplable to a vehicle, and the image data can be collected from the vehicle. For example, an image capture device can be communicatively coupled to a control unit or device which is part of the vehicle.

With reference to the example of scenario 500 in FIGS. 5A, 5B, 5C, and 5D, act 412 entails collecting image data for instants 500a, 500b, 500c, and 500d (and intervening instants). In particular, the collected image data in the example scenario includes at least images 600a, 600b, 600c, and 600d shown in FIGS. 6A, 6B, 6C, and 6D, and could include video data as the vehicle travels through instants 500a, 500b, 500c, and 500d. In some implementations, the data collection device includes the image capture device 592, such that act 412 entails capturing, by image capture device 592, at least images 600a, 600b, 600c, and 600d. In some implementations, the data collection device is separate from the image capture device 592 (e.g. the data collection device is a telematics device which couples to image capture device 592), such that act 412 entails receiving, by the data collection device, at least images 600a, 600b, 600c, and 600d as captured by image capture device 592.

At 414, the data collection device collects movement data representing movement of the vehicle. In this context, "movement data" can include any appropriate data from which movement of the vehicle can be derived. For example, in some implementations the data collection device includes a location sensor, which captures at least a portion of the movement data as location data representing a location of the vehicle (e.g. as a position of the vehicle over time). Movement of the vehicle can be determined based on change in position of the vehicle over time as indicated in the location data, as discussed in more detail later. In other implementations, the movement data can be received from the vehicle. For example, the data collection device can be communicatively couplable to a communication interface of the vehicle (such as an OBDII port), and the movement data can be collected by the data collection device, as reported by the vehicle. In this regard, the vehicle can include a location sensor, and can report position of the vehicle over time as the movement data. As another example, movement speed data and/or engine speed data of the vehicle can be reported to the data collection device by the vehicle as at least a portion of the movement data. In some implementations, the movement data can include data from multiple sources, and/or of multiple types. For example, the movement data can include location data from a location sensor in the data collection device or the vehicle, and can include vehicle speed or engine speed data from the vehicle.

With reference to the example of FIGS. 5A, 5B, 5C, and 5D, act 414 entails collecting movement data for the vehicle for instants 500*a*, 500*b*, 500*c*, and 500*d* (and can also include collecting movement data for intervening instants). In particular, the collected movement data can include a plurality of location and/or speed data points of the vehicle as the vehicle travels through instants 500*a*, 500*b*, 500*c*, and 500*d*.

Further, in some implementations, the data collection device can be communicatively coupled to the vehicle, and the vehicle can report both image data and movement data, as collected by sensors (e.g. an image capture device, a location sensor, a movement speed or engine speed sensor, etc.) included in or communicatively coupled to the vehicle. Further, in some implementations, the data collection device can include the necessary sensors and/or interfaces to collect both movement data and image data. For example, the data collection device can be a monolithic device which includes an image capture device and a location sensor. Additionally, any other appropriate device combination can be implemented to collect image data and movement data, based on the exemplary devices discussed previously which can function as or with a data collection device.

Acts 412 and 414 can be performed in any order, or at least partially simultaneously, as appropriate for a given application.

At 416, the at least one first processor at the vehicle identifies an event window where a stop sign is represented in the image data collected at 412, according to a first detection model. As an example, the first at least one processor runs a machine-learning or otherwise trained object detection model on images 600*a*, 600*b*, 600*c*, 600*d*, (and intervening images, if desired). Such a first detection model could include a YOLO5 model, or any other appropriate model. In some implementations, hardware resources at the vehicle may be limited, and in such cases it is desirable to use a light-weight model, or to run the first detection model on a limited area of image data, or reduced resolution of image data. This is discussed in more detail later. In this context, and throughout this disclosure, the term "event window" refers to a period of time where the stop sign is identified. That is, the event window refers to a time period where a stop sign identification event occurs.

In order to identify the event window where the stop sign is represented in the image data at 416, some conditions may be set on result of running the first detection model, as discussed below. That is, in some implementations, merely detecting the stop sign is not sufficient, but additional criteria must be satisfied for the detection to be considered legitimate and the event window to be identified.

In some implementations, a condition can be set such that the first detection model must detect that a stop sign is represented in the image data with a detection confidence which exceeds a confidence threshold. For example, the detection threshold can be set at 85%, such that when the first detection model detects a stop sign in image data with a confidence of less than 85%, the event window is not identified. The example of 85% is non-limiting, and any value can be used for detection confidence threshold, as appropriate for a given application. With reference to image 600*a* in the example of FIG. 6A, stop sign 526 is facing the image capture device, and consequently can be detected with greater confidence than stop sign 536, which is facing to the left in the image. As a result, the event window can be identified for stop sign 526 as represented in the image data, whereas the event window may not be identified for stop sign 536, despite being represented (to an extent) in the image data.

In some implementations, a condition can be set such that the first detection model must detect that a stop sign is detected in the image data for a detection time period which exceeds a detection time threshold. For example, if a stop sign is detected by the first detection model for only an instant, the first at least one processor may not identify the event window (as such a detection may arise due to error). For example, the detection time threshold can be 1.5 seconds (though any other appropriate time threshold could be set). With reference to the example of FIGS. 6A and 6B, stop sign 526 can be detected in image 600*a* and image 600*b* (and any intervening images). If these images span the detection time threshold (or longer), the first at least one processor can identify the event window as spanning the time period where stop sign 526 is detected. On the other hand, stop sign 536 is not visible in image 600*b*, and stop signs 546 and 556 are not visible enough in image 600*a* to be detected. With an appropriately set detection time threshold, stop signs 536, 546, and 556 can be excluded from triggering identification of the event window. This is helpful as these stop signs are not applicable to the vehicle 590 (since they apply to vehicles travelling in other directions).

In some implementations, a condition can be set such that vehicle speed must exceed a speed threshold in order for the event window to be identified. For example, the speed threshold may be set at 0 kilometers per hour, such that if a vehicle is stopped identification of the event window is not triggered. This acts as a means to prevent rolling stop detection for vehicles which are already stopped.

In some implementations, multiple conditions may be applied in combination in order for the event window to be identified at 416. For example, the first processor may identify the event window only when a stop sign is detected with a detection confidence which exceeds a confidence threshold, for a detection time period which exceeds a detection time threshold, and a speed of the vehicle as indicated in the movement data exceeds a speed threshold. As another example, the first processor may identify the event window only when a stop sign is detected with a detection confidence which exceeds a confidence threshold, for a detection time period which exceeds a detection time threshold. Any appropriate combination of conditions could be implemented on a per-application basis.

Applying conditions to identification of the event window as in act 416 advantageously reduces action taken based on false or ambiguous detection of stop signs. Since image data corresponding to the event window will be sent from the vehicle device as discussed later with reference to act 418, reducing needless or inaccurate identification of the event window can save bandwidth.

At 418, in response to identification of the event window, an image data segment can be sent by the first communication interface to the management device. The image data segment includes a portion of the image data corresponding to the event window, and a portion of the image data for a buffer time period following the event window. The buffer time period can be set as any appropriate time, but should be long enough such that the image data segment represents a sufficient amount of time that it can be effectively determined whether the vehicle properly stops at the stop sign. With reference to the example of scenario 500, stop sign 526 is only visible in images 600*a* and 600*b*. However, as can be seen in FIG. 5B, for instant 500*b* (which image 600*b* represents), vehicle 590 has not yet reached intersection 510 (in particular stop line 528). Rather, vehicle 590 reaches stop line 528 at instant 600*c*, which is approximately the instant when vehicle 590 should stop. However, image 600*c*, which represents instant 500*c*, does not include a representation of stop sign 526.

Consequently, if the image data segment only includes image data where a stop sign is represented (image data corresponding to the event window), the image data segment would not actually show the important moment (for rolling stop detection): i.e. the moment where the vehicle is supposed to stop. It is commonplace that, when a vehicle is positioned at the proper stopping position at an intersection, an applicable stop sign is not visible to an image capture device at the vehicle, hence the importance of including the portion of image data for a buffer time period. An exemplary buffer time period is 5 seconds, but any appropriate time period can be selected. In the example, the image data segment includes images 600*a* and 600*b* (where the stop sign 526 is identified), and image 600*c* and 600*d* (within the buffer time period). Inclusion of image 600*d* is not strictly necessary, as it represents a moment where the vehicle is already travelling through the intersection, but it can help provide a more complete picture of the vehicle's journey through intersection 510.

Returning to method 400, at 420 a movement data segment is sent from the vehicle (via the first communication interface) to the management device. The movement data segment includes a portion of the movement data which corresponds to the event window and the buffer time period, so that both movement data and image data are available to the management device for the vehicle's journey through the intersection.

Acts 418 and 420 can be performed in any appropriate order. In some implementations, acts 418 and 420 can be performed together or concurrently, such that the image data segment and the movement data segment are sent together.

As mentioned earlier, in some implementations the movement data is collected as location data. In some cases, the location data can be sent to the management device in act 420 (in the movement data segment). In other cases, the first at least one processor can receive the location data, and can determine speed data indicating a movement speed of the vehicle over time based on changes in the position of the vehicle as indicated in the location data. The movement data segment which is sent at 420 can be (or can include) the determined speed data. In some cases, location data which is ordinarily reported to a management device (e.g. for other purposes within a telematics system) may be filtered, downsampled, or otherwise reduced in frequency or accuracy, such that determining movement speed based thereon is less accurate than desired. Instead, determining movement speed at the vehicle device by the first at least one processor can improve accuracy of the determined vehicle speed since more accurate or plentiful location data is available.

Method 400 in FIG. 4 also includes a plurality of acts 450 performed at a management device. As mentioned earlier, the management device is not necessarily limited to a single device, but can be a distributed server or system which receives and handles data reported from vehicles.

At 452, the management device receives the image data segment from the vehicle (via the second communication interface). At 454, the management device receives the movement data segment from the vehicle (via the second communication interface). Acts 452 and 454 can be performed in any appropriate order, or together/concurrently. The term "receive" in this context can refer to the management device performing any necessary actions to intake the data, such as routing, formatting, processing, decompressing, etc.

Optionally, in some implementations, the management device can verify representation of the stop sign in the image data (or verify accuracy of identification of the event window), as shown at 455 in method 400. As a particular example, the second at least one processor at the management device can verify, according to a second detection model, that the at least one stop sign is represented in the image data segment as received from the vehicle. The second detection model is different from the first detection model. In particular, to optimize efficiency on limited computational resources at the vehicle, the first detection model can be a YOLOv5 model, whereas the second detection model at the management device can be a YOLOv5n model, which is a computationally more burdensome model, but is more accurate.

As another particular example, identifying the event window at the vehicle as in act 416 may be performed using a relatively limited version or form of the image data, compared to a verification at the management device. For example, act 416 can comprise identifying the event window where the stop sign is represented in a version of the image data having a first resolution. The first resolution is less than the resolution of the image data as captured, and could for example be a downscaled or cropped version of the image data. In this way, the amount of image data analyzed by the first at least one processor at the vehicle is reduced. On the other hand, the image data segment which is sent to the management device at 418 is of a second resolution greater than the first resolution. For example, the image data sent to the management device can have a native resolution at which the image capture device captures the image data (or at least be less reduced in size than the image data at the first resolution). At 455, the second at least one processor of the management device can verify that the stop sign is represented in the image data segment having image data of the second resolution. For example, the second at least one processor can run the first detection model on the image data having the second resolution. As another example, the second at least one processor can run a second detection model different from the first detection model on the image data having the second resolution. In this way, the management device can verify that the stop sign is represented in the image data segment having image data of the second resolution. By verifying based on both higher resolution image data and a second detection model, a more accurate result for identification of stop signs can be determined, such that needless false positives can be avoided.

The above acts of verification generally describe verifying that the stop sign is detected in higher resolution image data, or with a more powerful detection model, by the second at least one processor at the management device. Because of the higher resolution image data or more powerful detection model, it may not be necessary to verify identification of the event window (e.g. using the same conditions such as detection confidence threshold, detection time threshold, or vehicle speed threshold). In some implementations, however, the second at least one processor can verify identification of the event window similar to as performed in act 416, to ensure accuracy (e.g., the second at least one processor can effectively duplicate act 416, using higher resolution image data and/or a more power detection model). However, the exact criteria for identifying the event window do not need to be the same as used for act 416. For example, any of the conditions such as detection confidence threshold, detection time threshold, or vehicle speed threshold could be utilized (or not) by the second at least one processor in verification, regardless of utilization by the first at least one processor at act 416. Further, if used, the exact thresholds for any of the conditions as used by the second at least one processor do not need to be equal to the thresholds used in act 416. The thresholds could be higher for example (to ensure high accuracy and eliminate false positives), or lower (since the verification by the second at least one processor is already based on higher resolution image data and/or a more powerful detection model, and thus higher accuracy is already achieved).

At 456, the at least one second processor determines whether a movement speed of the vehicle as indicated in the movement data segment is below a threshold speed. For example, the threshold speed can be set as 0 kilometers per hour (i.e. stopped). In this way, if the vehicle is measured or determined as travel at 0 kilometers per hour during the event window or buffer time period, the stop is deemed as a safe stop (i.e. not a rolling stop). However, even if the vehicle does properly stop, such a stop may not appear in the movement data segment as a speed of 0 kilometers per hour. For example, speed data and location data are often measured at a low frequency (e.g. 1 Hz), so even if the vehicle reaches a speed of 0, such speed may not be measured if the speed of 0 is reached for less than a second. As another example, speed or location data may not be measured accurately, such that even at an actual speed of 0 the vehicle may still be determined as moving.

To address these issues, it can instead be more effective to set the speed threshold to a value above 0, such as 8 kilometers per hour. With such a speed threshold, most rolling stop events can still be detected, and those that aren't are at least low-speed rolling stop events, which are less dangerous. Further, accuracy of act 456 can be increased by determining not only whether a movement speed of the vehicle is below a threshold speed, but whether the movement speed of the vehicle as represented in the movement data is below a threshold speed for an amount of time that exceeds a stop threshold. Such a stop threshold could be for example 1 second, but any appropriate time could be used. Thus, to determine whether a stop was safely made, the second at least one processor can determine whether a speed of the vehicle was below 8 kilometers per hour for at least one second (in the illustrative example).

In implementations where the movement data segment does not include a movement speed of the vehicle (e.g. implementations where the vehicle device sends only location data in the movement data segment), the second at least one processor can determine movement speed of the vehicle over time based on changes in the location data, similarly to as discussed earlier. This can be performed as part of act 456, or prior to act 456.

In some implementations, determining whether a movement speed of the vehicle as indicated in the movement data segment is below a threshold speed as in act 456 may entail determining whether a movement speed of the vehicle as indicated in a subsection of the movement data segment is below the threshold speed. For example, a beginning portion of the event window may be ignored for analysis of the movement speed of the vehicle, as stops in the beginning portion may not correspond to stopping at an appropriate location (e.g. where a stop sign designates stopping should be performed). This is discussed in more detail later with reference to FIG. 9.

At 458, an indication is output if/when the movement speed of the vehicle is not below the threshold speed (as determined at 456). That is, if a rolling stop event is detected, an indication is output. Such an indication can take a variety of forms, as discussed below.

In one implementation, the indication at 458 is sent to the vehicle (via the second communication interface). The indication is received at the vehicle (via the first communication interface), and outputs an alert to the driver of the vehicle at 422. Such an alert can be, for example, an audio alert presented through an audio device (e.g. speakers or stereo) at the vehicle, or a visual alert presented through a display (e.g. infotainment center) at the vehicle. For example, the alert can inform the driver of the rolling stop event, and caution them to properly stop in the future. In this regard, FIG. 7 illustrates an exemplary user interface 700. Interface 700 is a visual interface, which can be presented by a display at the vehicle. Interface 700 includes text "Alert: Rolling Stop", which indicates the improper behavior to the driver. Further, interface 700 shows text "Please come to a complete stop at all stop signs.", as advice to the driver to avoid future alerts. Interface 700 is merely exemplary, and alerts can be presented to a driver in any appropriate format, with any appropriate information.

In another implementation, the indication is output to storage at the management device, or an associated database. For example, the indication can be included in a driver behavior report, used to evaluate and coach the driver in the future. Further, the image data segment and movement data associated with the rolling stop incident can also be stored with the indication (e.g. the report), for review in the future, as shown at 460 in FIG. 4. In this regard, FIG. 8 shows a user interface 800 by which such a driver behavior report can be presented. In FIG. 8, a Driver Behavior Report for a hypothetical driver named John Smith is shown. User interface 800 could be presented via an operator device, such as via display 322 of operator device 300 in FIG. 3. Interface 800 lists a number of event types (in this example, all negative and representing safety concerns; though in some implementations positive driver behavior can also be reported). Further a number of occurrences of each event type within the last 30 days are also shown (5 rolling stops, 2 speeding events, 4 harsh braking events, and 1 harsh cornering event). Interface 800 also includes a link to access supporting event data for each event type (such as a stored image data segment or movement data segment for each event as mentioned earlier). A report such as that shown in FIG. 8 can be reviewed by a manager or supervisor of the Driver, and corrective action can be taken (e.g. coaching, disciplinary action, or rewards for safe-performing drivers). Interface

800 is merely exemplary, and driver behavior reports can be presented in any appropriate format, with any appropriate information.

Figure 9:
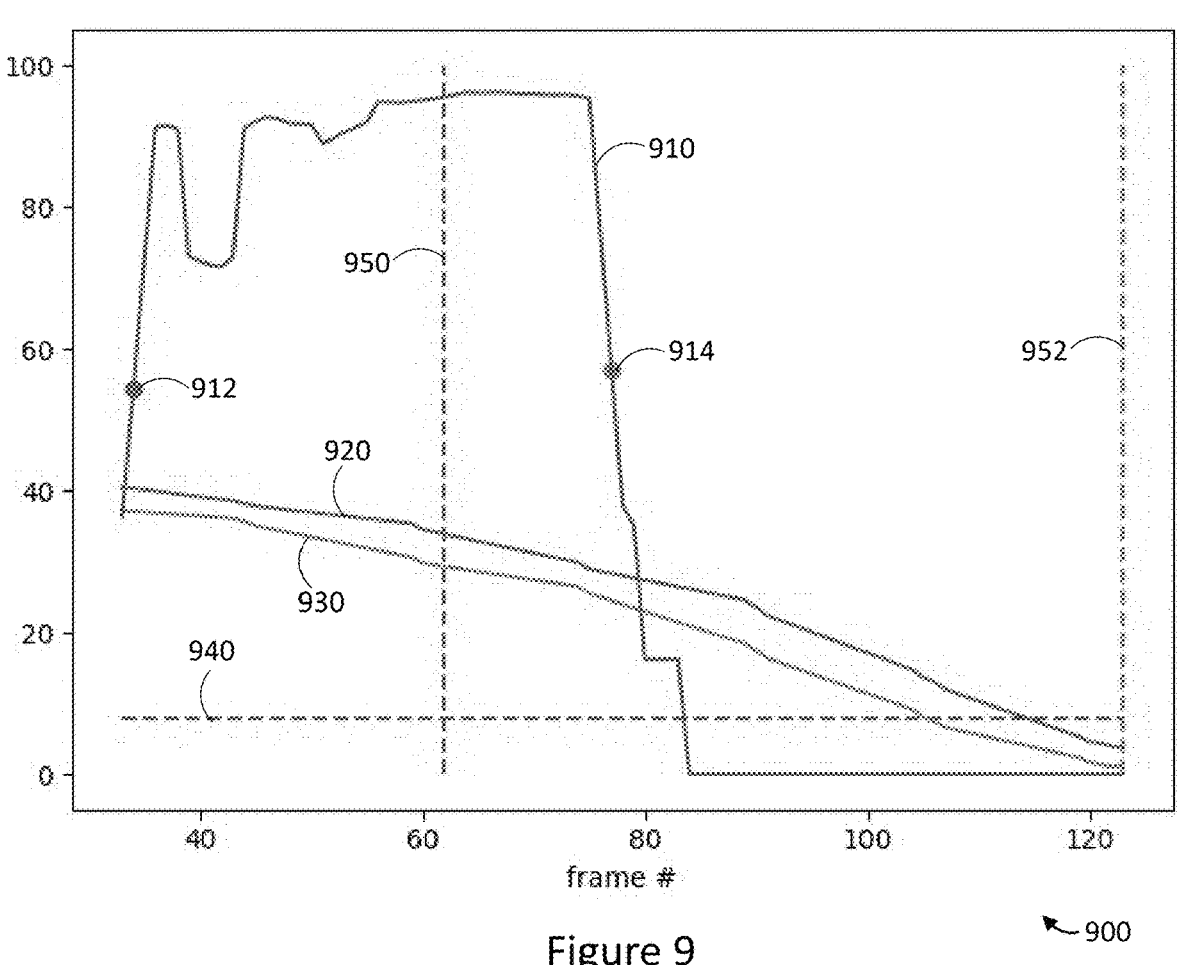
FIG. 9 illustrates an exemplary plot showing an event window and buffer time period for rolling stop detection.

In some implementations, the image data includes data points at a first frequency, and the movement data includes data points at a second frequency lower than the first frequency. In an illustrative example, the image data is captured at 15 frames per second, whereas the movement data is captured at 1 Hz. These frequencies are merely exemplary, and any appropriate data collection frequencies could be used. To address this difference in frequencies, the lower frequency data (in this example, the movement data) is interpolated to include data points at the first frequency (i.e. the movement data is interpolated to match the first frequency). This interpolation can be performed at the vehicle, by the first at least one processor. At 420, the movement data which is sent can include the interpolated data points at the first frequency. In other implementations, the interpolation can be performed at the management device, by the second at least one processor. FIG. 9 discussed below illustrates an example where the movement data has been interpolated to a frequency of the image data.

FIG. 9 illustrates an exemplary plot 900, showing a variety of attributes for a vehicle, correlated to image data over time (as indicated by frame number in the image data along the horizontal axis). In particular, plot 900 illustrates a stop sign detection confidence curve 910, a vehicle speed curve 920 based on location data, and a vehicle speed curve 930 based on speed data received from the vehicle. Stop sign detection confidence curve 910 is expressed as a percentage between 0% and 100%. Vehicle speed curves 920 and 930 are expressed in kilometers per hour. Points 912 and 914 represent points where stop sign detection confidence crosses a detection confidence threshold (in this example, about 55%). In particular, at point 912, detection confidence for a stop sign rises above the detection confidence threshold (i.e. the stop sign appears in the image data to a sufficient extent that it can be detected reasonably reliably by an object detection model). For example, point 912 can correspond to instant 500a in FIGS. 5A and 6A, where a vehicle is close enough to stop sign 526 for an object detection model to detect stop sign 526. At point 914, detection confidence for a stop sign falls below the detection confidence threshold (i.e. the stop sign is no longer reasonable detectable by an object detection model). For example, point 914 can correspond to a time shortly after instant 500b in FIGS. 5A and 6B, where stop sign 526 is no longer in the field of view of image capture device 592 (and thus is no longer detectable in image data captured by image capture device 592). In this sense, an "event window" can be identified between points 912 and 914 (approximately frames 36 to 77) in accordance with act 416 of method 400.

FIG. 9 also illustrates time boundaries 950 and 952. Time boundaries 950 and 952 represent a time period during which rolling stop detection can be performed (i.e., act 456 in method 400 can be performed for data between time boundaries 950 and 952). In the illustrated example, the time period between point 914 and time boundary 952 corresponds to the buffer time period as referenced in acts 418 and 420 of method 400. That is, the time period between point 914 and time boundary 952 represents a buffer period after the last frame where the stop sign was detected. In some implementations, time boundary 950 can coincide with point 912, such that rolling stop detection is performed for the entire event window and buffer time period. However, in the example shown in FIG. 9, time boundary 950 is shown as occurring at a later frame (later point in time) than point 912. This is because in many cases, a position of a vehicle from which a stop sign can be detected is not necessarily an appropriate position to stop (or does not correspond to a location where the vehicle should stop relative to the detected stop sign). Consequently, to remove false positives where a vehicle stop is identified prior to an appropriate stop location, time boundary 950 can be set to be later in time than point 912, as illustrated in FIG. 9. The exact timing of time boundary 950 can be set as appropriate for a given application. In some implementations, time boundary 950 can defined to be a set amount of time after point 912, or a set amount of time prior to point 914. As one example, time boundary 950 be defined to be one second prior to point 914. In some implementations, time boundary 950 and time boundary 952 can be configurable by an operator. In particular, different fleets may find that different detection ranges are particularly suitable for a particular fleet, and so time boundaries 950 and 952 can be set by an operator (e.g. via device 300) to produce optimal detection results for a particular fleet. That is, the buffer time period and a time period in the event window where rolling stop detection is performed can be adjusted as appropriate by an operator.

FIG. 9 also shows a threshold speed 940. In the illustrated example, the threshold speed is 8 kilometers per hour, but any appropriate speed could be used for a given application. Further, the threshold speed can be configurable by an operator (such as via device 300), to optimize rolling stop detection for a particular fleet. As discussed earlier with reference to act 456 of method 400, if vehicle speed drops below the speed threshold (and optionally, stays below the speed threshold for a time threshold), the vehicle can be identified as having "stopped" for the purposes of rolling stop detection (such that an indication is not output at 458 in method 400). Further, the time threshold can also be configurable by an operator in some implementations.

As can be seen in FIG. 9, vehicle speed curve 920 based on location data is consistently higher than vehicle speed curve 930 based on speed data from the vehicle. For an example where the image data has a framerate of 15 frames per second, a speed threshold of 8 kilometers per hour, and a time threshold of 1 second, the vehicle is determined as stopping (in act 456 of method 400) based on vehicle speed curve 930, but is determined as not stopping based on vehicle speed curve 920. That is, in this example, at 458 in method 400, an indication is output based on the vehicle speed curve 920, but not based on the vehicle speed curve 930. To address such differences, in implementations where location data is used to derive vehicle speed, speed threshold 940 may be set higher than implementations where vehicle speed data is collected from the vehicle.

Figure 10:
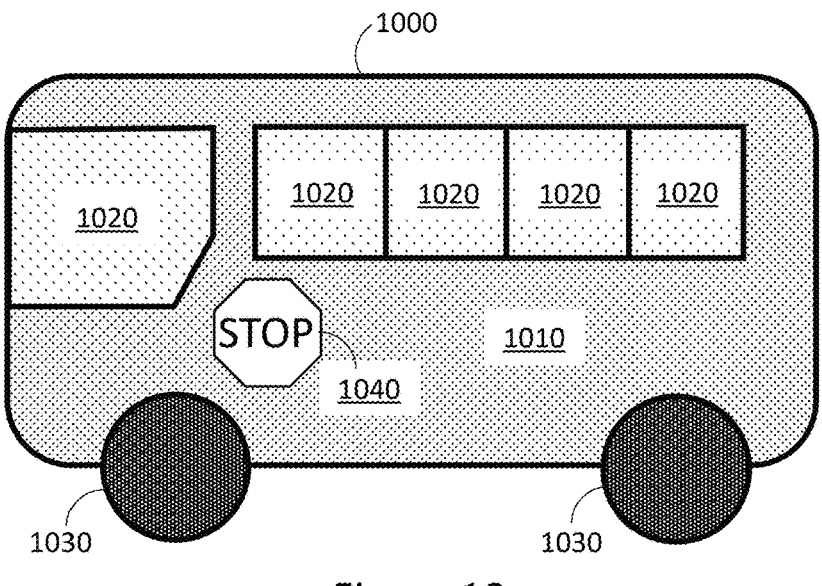
FIG. 10 is a side view of a bus having a stop sign thereon.

In some scenarios, stop signs or objects resembling stop signs may be visible in the environment in situations where a vehicle is not expected to stop at such stop signs. FIG. 10 illustrates an example in this regard.

FIG. 10 is a side view of a school bus 1000. School bus 1000 has a body 1010, windows 1020, wheels 1030, and a stop sign 1040 mounted to body 1010. Stop sign 1040 is movable between a retracted configuration (as shown in FIG. 10) where stop sign 1040 is parallel to (or relatively flat against) body 1010, and an extended configuration where stop sign 1040 projects outward (perpendicular to) body 1010. In the extended configuration, stop sign 1040 is clearly visible to vehicles positioned in front of or behind bus 1000 (with reference to the perspective of bus 1000, and corresponding to left and right of bus 1000 as shown in FIG. 10). In the extended configuration, vehicles are generally required to stop, and are not allowed to pass or go around bus 1000. When in the retracted configuration stop sign 1040 is visible to vehicles beside bus 1000, with reference to the perspective of bus 1000. Stated differently, stop sign 1040 in the retracted configuration is visible to vehicles which view bus 1000 in the perspective of FIG. 10. However, stop sign 1040 is generally not applicable when in the retracted configuration; that is, other vehicles do not need to heed stop sign 1040 when it is in the retracted configuration shown in FIG. 10. If stop sign 1040 were represented in image data captured by an image capture device, stop sign 1040 may result in identification of an event window in act 416 of method 400, and subsequent identification of a rolling stop at 456. However, with stop sign 1040 in the retracted configuration, such an identification would be inappropriate, because the driver is not expected to stop at stop sign 1040 in such a case. To address this issue, a stop sign filtering step can be included in method 400, as discussed below.

In some implementations, after identifying an event window where a stop sign is represented in the image data, a stop sign filtering model can be used eliminate inappropriate stop sign identifications. For example, an object detection model can be trained not only to detect stop signs, but also to detect buses, and/or stop signs positioned on buses. This stop sign filtering model can be executed on the image data included the representation of the stop sign. If the stop sign is detected as being positioned on a bus, the identified event window can be dropped, eliminated, or otherwise not acted on in the context of method 400. As mentioned earlier, this stop sign filtering model can be executed after the event is identified, e.g. as a step performed by the first at least one processor at the vehicle subsequent act 416, or alternatively as a step performed by the second at least one processor at the management device (e.g. as part of the verification at 455). In other implementations, execution of the stop-sign filtering model can be performed as part of act 416.

The example of FIG. 10, where the stop sign is positioned on a bus, is merely exemplary, and other examples of stop sign representations where a vehicle is not required to stop can also be accounted for. A non-limiting example includes red octagons (or equivalent regional shapes of stop sign, in regions where a stop sign is not necessarily a red octagon, such as an inverted red triangle in Japan) which lack appropriate other stop sign features (such as the word "STOP" or regional equivalent, e.g. "ARRÊT" in French-speaking regions). Other examples could include non-binding stop sign representations, such as on billboards, signs, bumper stickers, etcetera.

To train an object or feature detection model used in stop sign filtering, training images can be generated based on a three-dimensional model of an object or scenario, which the detection model is being trained to filter. For example, a three-dimensional model of bus 1000 could be rendered in several images, from different angles, to produce a training set of images. The detection model can then be trained based on the training set of images. The three-dimensional model can be generated by any appropriate means, including being based on at least one CAD model of a bus, being manually crafted using three-dimensional modelling software, or being generated automatically such as by a Point Bind LLM (large language model).

While the present invention has been described with respect to the non-limiting embodiments, it is to be understood that the invention is not limited to the disclosed embodiments. Persons skilled in the art understand that the disclosed invention is intended to cover various modifications and equivalent arrangements included within the scope of the appended claims. Thus, the present invention should not be limited by any of the described embodiments.

Throughout this specification and the appended claims, infinitive verb forms are often used, such as "to operate" or "to couple". Unless context dictates otherwise, such infinitive verb forms are used in an open and inclusive manner, such as "to at least operate" or "to at least couple".

The Drawings are not necessarily to scale and may be illustrated by phantom lines, diagrammatic representations, and fragmentary views. In certain instances, details that are not necessary for an understanding of the exemplary embodiments or that render other details difficult to perceive may have been omitted.

The specification includes various implementations in the form of block diagrams, schematics, and flowcharts. A person of skill in the art will appreciate that any function or operation within such block diagrams, schematics, and flowcharts can be implemented by a wide range of hardware, software, firmware, or combination thereof. As non-limiting examples, the various embodiments herein can be implemented in one or more of: application-specific integrated circuits (ASICs), standard integrated circuits (ICs), programmable logic devices (PLDs), field-programmable gate arrays (FPGAs), computer programs executed by any number of computers or processors, programs executed by one or more control units or processor units, firmware, or any combination thereof.

The disclosure includes descriptions of several processors. Said processors can be implemented as any hardware capable of processing data, such as application-specific integrated circuits (ASICs), standard integrated circuits (ICs), programmable logic devices (PLDs), field-programmable gate arrays (FPGAs), logic circuits, or any other appropriate hardware. The disclosure also includes descriptions of several non-transitory processor-readable storage mediums. Said non-transitory processor-readable storage mediums can be implemented as any hardware capable of storing data, such as magnetic drives, flash drives, RAM, or any other appropriate data storage hardware. Further, mention of data or information being stored at a device generally refers to the data information being stored at a non-transitory processor-readable storage medium of said device.

What is claimed is:

1. A system comprising:

at least one data collection device positioned at a vehicle;

a first communication interface positioned at the vehicle;

a first at least one processor positioned at the vehicle;

a first at least one non-transitory processor-readable storage medium positioned at the vehicle and communicatively coupled to the first at least one processor, the first at least one non-transitory processor-readable storage medium storing first processor-executable instructions which when executed by the first at least one processor cause the system to:

collect, by the at least one data collection device, image data representing an environment of the vehicle;

collect, by the at least one data collection device, movement data representing movement of the vehicle;

execute, by the first at least one processor, a trained first detection model to detect a stop sign represented in the image data;

identify, by the first at least one processor, an event window where the stop sign is represented in the image data according to the first detection model;

in response to identification of the event window, send, by the first communication interface, an image data segment which includes a portion of the image data corresponding to the event window, and which includes a portion of the image data for a buffer time period following the event window, where for the buffer period the stop sign is not detectable in the image data according to the first detection model; and send, by the first communication interface, a movement data segment including a portion of the movement data corresponding to the event window and the buffer time period;

a second communication interface positioned at a management device remote from the vehicle;

a second at least one processor positioned at the management device; and a second at least one non-transitory processor-readable storage medium positioned at the management device and communicatively coupled to the second at least one processor, the second at least one non-transitory processor-readable storage medium storing second processor-executable instructions which when executed by the second at least one processor cause the system to:

receive, via the second communication interface, the image data segment;

receive, via the second communication interface, the movement data segment;

determine, by the second at least one processor, whether a movement speed of the vehicle as represented in the buffer time period of the movement data segment is below a threshold speed; and output an indication when movement speed of the vehicle as represented in the buffer time period of the movement data segment is not below the threshold speed.

2. The system of claim 1, wherein the second processor-executable instructions further cause the second at least one processor to, prior to determining whether a speed of the vehicle is below a threshold speed:

verify, according to a second detection model, that the stop sign is represented in the image data segment.

3. The system of claim 1, wherein:

the first processor-executable instructions which cause the first at least one processor to identify the event window cause the first at least one processor to: identify the event window where a stop sign is represented in a version of the image data having a first resolution; and the first processor-executable instructions which cause the first communication interface to send the image data segment cause the first communication interface to send the image data segment having image data of a second resolution greater than the first resolution.

4. The system of claim 3, wherein the second processor-executable instructions further cause the second at least one processor to, prior to determining whether a speed of the vehicle is below a threshold speed:

verify that the stop sign is represented in the image data segment having image data of the second resolution.

5. The system of claim 4, wherein the second processor-executable instructions which cause the second at least one processor to verify that the stop sign is represented in the image data segment having image data of the second resolution cause the second at least one processor to:

verify, in accordance with a second detection model different from the first detection model, that the stop sign is represented in the image data segment having image data of the second resolution.

6. The system of claim 1, wherein the first processor-executable instructions which cause the first at least one processor to identify the event window cause the first at least one processor to identify the event window where the stop sign is represented in the image under at least one condition of a group of conditions consisting of:

a detection confidence by the first detection model exceeds a confidence threshold;

a detection time period by the first detection model exceeds a detection time threshold; and a speed of the vehicle as indicated in the movement data segment exceeds a speed threshold.

7. The system of claim 1, wherein the first processor-executable instructions which cause the first at least one processor to identify the event window cause the first at least one processor to identify the event window where the stop sign is recognized according to the first detection model with a detection confidence which exceeds a confidence threshold, for a detection time period which exceeds a detection time threshold, and where a speed of the vehicle as indicated in the movement data exceeds a speed threshold.

8. The system of claim 1, wherein the at least one data collection device includes at least one image capture device which captures the image data.

9. The system of claim 1, wherein the at least one data collection device includes a location sensor which captures at least a portion of the movement data as location data representing a location of the vehicle.

10. The system of claim 1, wherein the at least one data collection device is communicatively couplable to an image capture device, to receive the image data as captured by the image capture device.

11. The system of claim 1, wherein the at least one data collection device is communicatively couplable to a communication interface of the vehicle, to receive at least one of the image data or the movement data from the vehicle.

12. The system of claim 1, wherein the at least one data collection device is communicatively couplable to a communication interface of the vehicle, to receive at least a portion of the movement data from the vehicle as speed data indicative of a movement speed of the vehicle.

13. The system of claim 1, wherein:

the movement data comprises location data indicative of a position of the vehicle over time;

the first processor-executable instructions further cause the first at least one processor to determine a movement speed of the vehicle over time based on changes in the location data; and the first processor-executable instructions which cause the first communication interface to send the movement data segment cause the first communication interface to send the movement data segment including the determined movement speed of the vehicle.

14. The system of claim 1, wherein:

the movement data comprises location data indicative of a position of the vehicle over time; and the second processor-executable instructions further cause the second at least one processor to determine a movement speed of the vehicle over time based on changes in the location data.

15. The system of claim 1, wherein the second processor-executable instructions which cause the second at least one processor to determine whether the movement speed of the vehicle as represented in the movement data segment is below a threshold speed cause the second at least one processor to:

determine whether the movement speed of the vehicle as represented in the movement data segment is below a threshold speed for an amount of time which exceeds a stop time threshold.

16. The system of claim 1, wherein:

the image data includes data points at a first frequency;

the movement data includes data points at a second frequency lower than the first frequency;

the first processor-executable instructions further cause the at least one first processor to interpolate the movement data to include data points at the first frequency; and the first processor executable instructions which cause the first communication interface to send the movement data segment cause the first communication interface to send the movement data segment including interpolated data points at the first frequency.

17. The system of claim 1, wherein:

the second processor-executable instructions further cause the management device to send, via the second communication interface, the indication to the first communication interface; and in response to the first communication interface receiving the indication, output, by an output interface at the vehicle, an alert to a driver of the vehicle that a rolling stop was performed.

18. The system of claim 1, wherein:

the second processor-executable instructions further cause the management device to output the indication in a driver behavior report associated with a driver of the vehicle.

19. The system of claim 18, wherein:

the second processor-executable instructions further cause the second at least one non-transitory processor-readable storage medium to store the image data segment and the movement data segment associated with the indication.

20. The system of claim 1, wherein the second processor-executable instructions further cause the at least one second processor to execute a stop-sign filtering model on the image data segment, wherein the stop-sign filtering model is configured to detect and exclude event windows corresponding to stop signs classified as being attached to another vehicle.

* * * * *